(12) United States Patent
Aoyama

(10) Patent No.: US 10,895,627 B2
(45) Date of Patent: Jan. 19, 2021

(54) SELF-POSITION ESTIMATION APPARATUS AND SELF-POSITION ESTIMATION METHOD

(71) Applicant: HONDA MOTOR CO., LTD., Tokyo (JP)

(72) Inventor: Chiaki Aoyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 404 days.

(21) Appl. No.: 15/434,367

(22) Filed: Feb. 16, 2017

(65) Prior Publication Data

US 2017/0276766 A1 Sep. 28, 2017

(30) Foreign Application Priority Data

Mar. 25, 2016 (JP) ................................ 2016-062189

(51) Int. Cl.
| | | |
|---|---|---|
| *G01S 5/16* | (2006.01) | |
| *G01S 3/781* | (2006.01) | |
| *G01C 21/26* | (2006.01) | |
| *G01S 5/10* | (2006.01) | |
| *G06T 7/00* | (2017.01) | |
| *H04N 17/00* | (2006.01) | |
| *G01C 3/08* | (2006.01) | |
| *G06M 7/00* | (2006.01) | |

(Continued)

(52) U.S. Cl.
CPC ................ *G01S 5/16* (2013.01); *G01S 3/781* (2013.01); *G01C 21/165* (2013.01)

(58) Field of Classification Search
CPC ... G01S 5/16; G01S 3/781; G01S 5/10; G01C 21/165; G01C 3/08; G06M 7/00; G05D 1/02; G06T 7/00; H04N 17/00
See application file for complete search history.

(56) References Cited

U.S. PATENT DOCUMENTS 5,025,377 A * 6/1991 Kamimura ........... G05D 1/0244
180/169
6,424,914 B1 * 7/2002 Lin ....................... G01C 21/165
342/357.29

(Continued)

FOREIGN PATENT DOCUMENTS

| JP | 2001141801 A | * | 5/2001 | | |
|---|---|---|---|---|---|
| JP | 2001141801 A | * | 5/2001 | ............... | G01S 5/10 |

(Continued)

OTHER PUBLICATIONS

Foreign English Translation, Sato et al. [Sato] (JP 2001-141801 A), pp. 1-19 (Year: 2001).*

(Continued)

*Primary Examiner* — Yuri Kan
*Assistant Examiner* — Majdi Alsomiri
(74) *Attorney, Agent, or Firm* — Rankin, Hill & Clark LLP

(57) ABSTRACT

A self-position estimation apparatus includes: a light reception unit that receives a light emission signal from a transmission apparatus via a pixel; and a position calculation unit that selects at least one, in accordance with the number of the light emission signals acquired by the light reception unit and which are used for a calculation of a self-position, from a plurality of algorithms in which the self-position is estimated and calculates the self-position by using the selected algorithm.

11 Claims, 12 Drawing Sheets

(51) Int. Cl.
*G05D 1/02* (2020.01)
*G01C 21/16* (2006.01)

(56) References Cited

U.S. PATENT DOCUMENTS

| | | | | |
|---|---|---|---|---|
| 6,603,865 | B1* | 8/2003 | Yagi | G06T 7/70 |
| | | | | 382/103 |
| 6,845,239 | B1* | 1/2005 | Sato | G01S 5/0027 |
| | | | | 342/457 |
| 2008/0001072 | A1* | 1/2008 | Chang | G06F 3/0421 |
| | | | | 250/221 |
| 2008/0086236 | A1* | 4/2008 | Saito | G01S 5/0252 |
| | | | | 700/245 |
| 2008/0310680 | A1* | 12/2008 | Azuma | G06K 9/00791 |
| | | | | 382/104 |
| 2009/0225165 | A1* | 9/2009 | Reneker | G01C 11/02 |
| | | | | 348/144 |
| 2011/0244881 | A1* | 10/2011 | Bando | G01S 5/0072 |
| | | | | 455/456.1 |
| 2012/0162633 | A1* | 6/2012 | Roberts | G01S 5/16 |
| | | | | 356/5.09 |
| 2012/0221244 | A1* | 8/2012 | Georgy | G01C 21/165 |
| | | | | 701/472 |
| 2015/0019159 | A1* | 1/2015 | Elgersma | G01R 35/005 |
| | | | | 702/150 |
| 2015/0025838 | A1* | 1/2015 | Yamada | H04W 64/006 |
| | | | | 702/150 |
| 2015/0198697 | A1* | 7/2015 | Kishigami | G01S 13/26 |
| | | | | 342/145 |
| 2015/0377609 | A1* | 12/2015 | Shen | G01B 11/14 |
| | | | | 356/4.07 |
| 2016/0014406 | A1* | 1/2016 | Takahashi | G06T 7/246 |
| | | | | 348/148 |
| 2017/0024617 | A1* | 1/2017 | Yamaguchi | G01C 21/28 |
| 2017/0123060 | A1* | 5/2017 | Yamashita | B64D 47/00 |
| 2017/0261315 | A1* | 9/2017 | Yamaguchi | G01C 21/28 |
| 2017/0357858 | A1* | 12/2017 | Mendonca | G06K 9/00664 |

FOREIGN PATENT DOCUMENTS

| | | |
|---|---|---|
| JP | 3590744 | 8/2004 |
| JP | 2006-220465 | 8/2006 |
| JP | 2008-014776 | 1/2008 |
| JP | 2008-215991 | 9/2008 |
| JP | 2009-036571 | 2/2009 |
| JP | 2009-145055 | 7/2009 |
| JP | 2009-288173 | 12/2009 |
| JP | 2012-207996 | 10/2012 |

OTHER PUBLICATIONS

Japanese Office Action dated Nov. 5, 2019, English translation included, 8 pages.

\* cited by examiner

FIG. 1
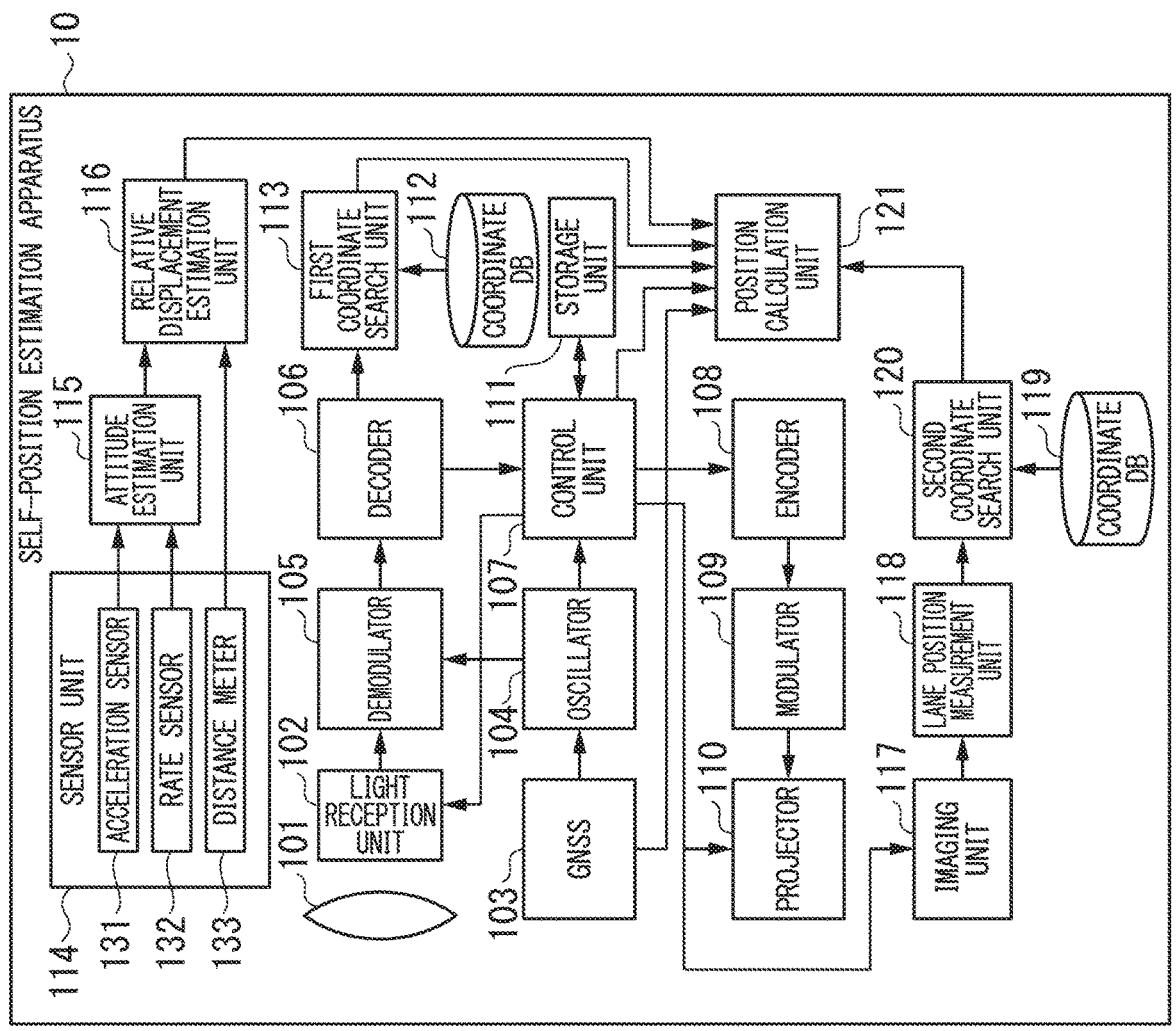
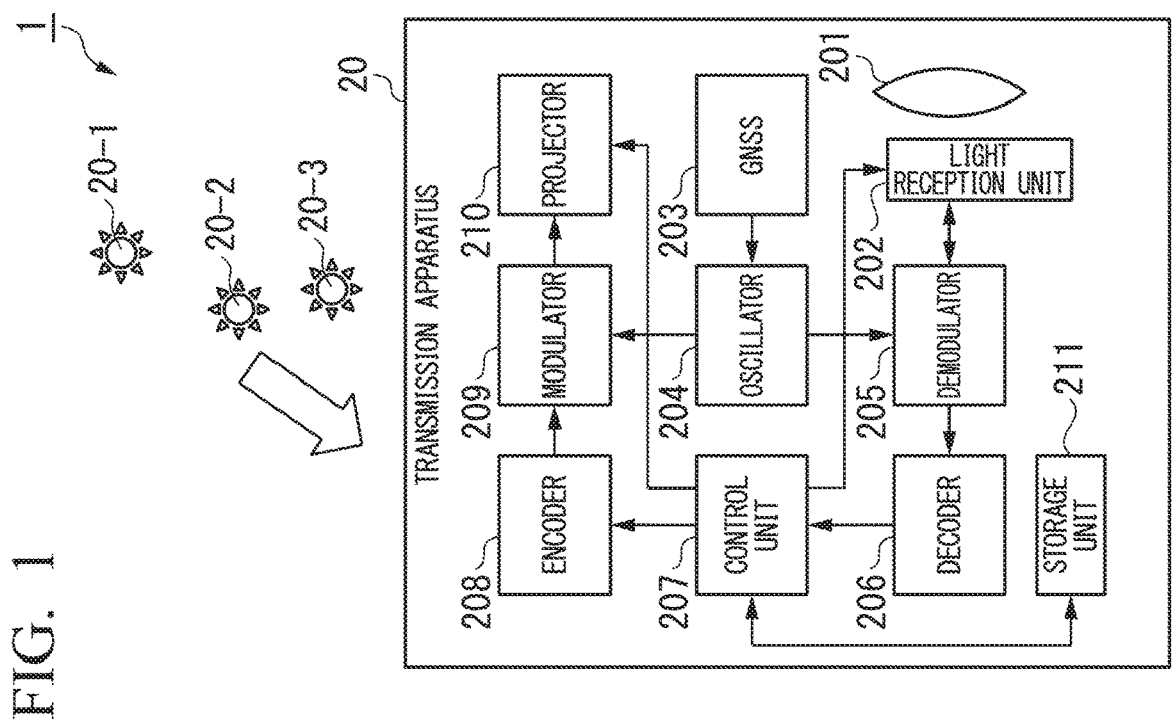

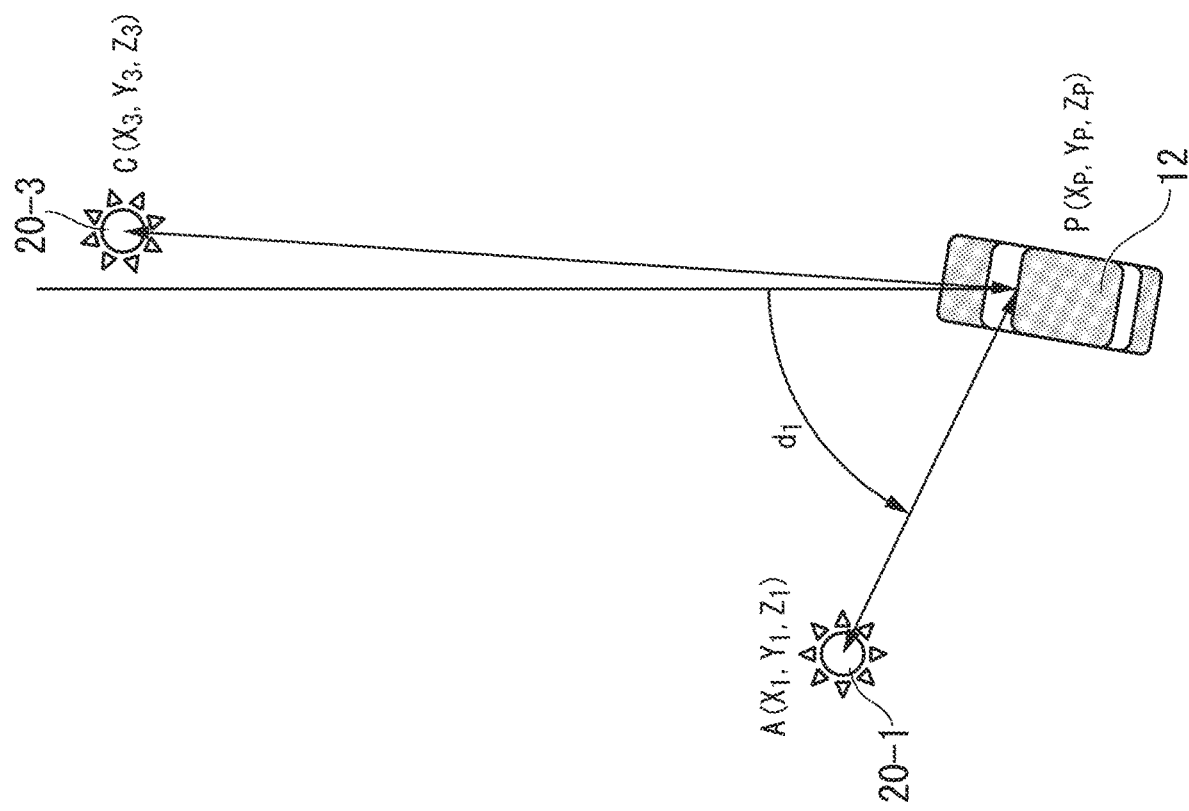
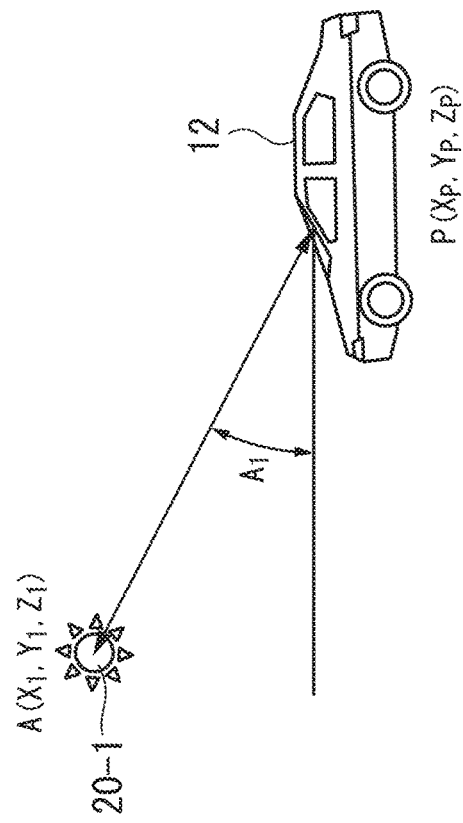
FIG. 14

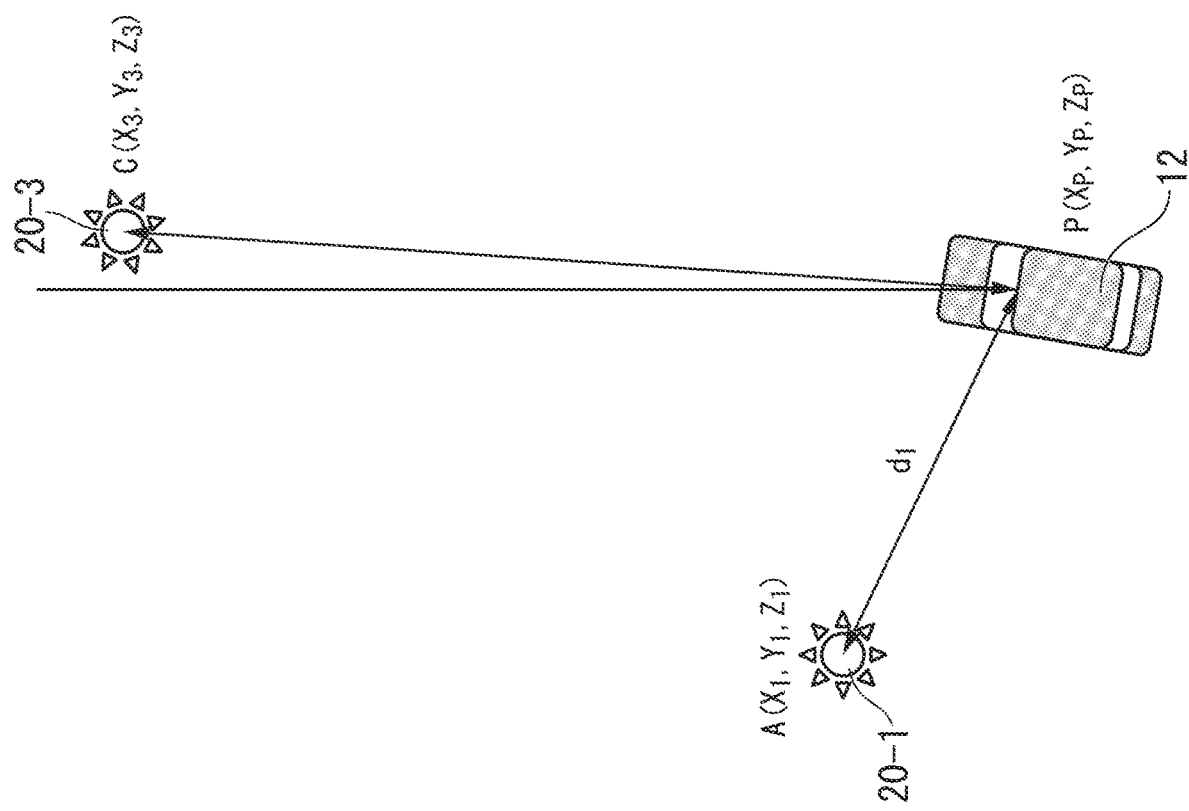
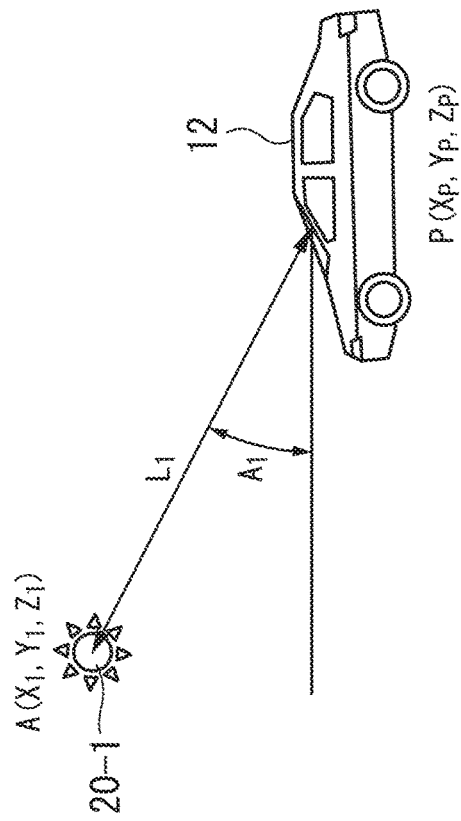
FIG. 15

SELF-POSITION ESTIMATION APPARATUS AND SELF-POSITION ESTIMATION METHOD

CROSS-REFERENCE TO RELATED APPLICATION

Priority is claimed on Japanese Patent Application No. 2016-062189, filed on Mar. 25, 2016, the contents of which are incorporated herein by reference.

BACKGROUND

Field of the Invention

The present invention relates to a self-position estimation apparatus and a self-position estimation method.

Background

Currently, as means for obtaining a position of a mobile object, techniques have been proposed in which, based on position information sent from three base stations and a measured phase difference between the base stations, the difference between distances of a mobile station and the base stations is calculated to measure the position of a mobile object (for example, refer to Japanese Patent No. 3590744).

Recently, in ITS (Intelligent Transport Systems), a radio beacon, an optical beacon, and a FM multiplex broadcast are used as information transmission means to a mobile object. When a vehicle as a mobile object receives an optical beacon, there may be a case in which the number of receivable transmission signals fluctuates depending on the road environment or the like.

SUMMARY

However, according to the technique disclosed in Japanese Patent No. 3590744, a self-position cannot be obtained when the number of optically receivable transmission signals fluctuates in an optical communication.

An object of an aspect of the present invention provides a self-position estimation apparatus and a self-position estimation method capable of correctly obtaining a self-position even when the number of transmission signals available for a self-position calculation in an optical communication fluctuates.

(1) A self-position estimation apparatus according to an aspect of the present invention includes: a light reception unit that receives a light emission signal from a transmission apparatus via a pixel; and a position calculation unit that selects at least one, in accordance with the number of the light emission signals acquired by the light reception unit and which are used for a calculation of a self-position, from a plurality of algorithms in which the self-position is estimated and calculates the self-position by using the selected algorithm.

(2) In the above self-position estimation apparatus, the position calculation unit may estimate the self-position by using at least one of a position of the transmission apparatus, an attitude of the self-position estimation apparatus, a distance between the transmission apparatus and the self-position estimation apparatus, an altitude of the self-position estimation apparatus, an azimuth angle between the transmission apparatus and the self-position estimation apparatus, an elevation/depression angle between the transmission apparatus and the self-position estimation apparatus, position information of a road on which a vehicle including a self-position estimation apparatus is traveling, and an azimuth angle of the self-position estimation apparatus.

(3) In the above self-position estimation apparatus, when the position calculation unit selects two or more algorithms from the plurality of algorithms, the position calculation unit may calculate the self-position according to at least one of: a process of selecting at least one algorithm from the two or more algorithms based on a predetermined priority or selecting at least one from the self-positions calculated according to the two or more algorithms based on a predetermined priority; a process of calculating an average value of the calculated self-positions; a process of performing a predetermined weighting with respect to the calculated self-positions and then calculating an average of the weighted self-positions; and a process of performing a clustering with respect to the calculated self-positions and calculating the self-position based on a cluster.

(4) In the above self-position estimation apparatus, when the light reception unit acquires four or more light emission signals, the position calculation unit may calculate the self-position according to at least one of: a process of selecting three or less light emission signals from the four or more light emission signals, selecting two or more algorithms from the plurality of algorithms by using the selected light emission signals, and selecting at least one algorithm from the two or more algorithms based on a predetermined priority or selecting at least one from the self-positions calculated according to the two or more algorithms based on a predetermined priority; a process of calculating an average value of the calculated self-positions; a process of performing a predetermined weighting with respect to the calculated self-positions and then calculating an average of the weighted self-positions; and a process of performing a clustering with respect to the calculated self-positions and calculating the self-position based on a cluster.

(5) In the above self-position estimation apparatus, when the number of the light emission signals available for a self-position calculation is three, the position calculation unit: may select a first algorithm when positions of the three transmission apparatuses and an attitude of the self-position estimation apparatus are known and may estimate the self-position based on the positions of the three transmission apparatuses and the attitude of the self-position estimation apparatus; may select a second algorithm when positions of the three transmission apparatuses and each distance between each of the three transmission apparatuses and the self-position estimation apparatus are known and may estimate the self-position based on the positions of the three transmission apparatuses and each distance between each of the three transmission apparatuses and the self-position estimation apparatus; and may select a third algorithm when positions of the three transmission apparatuses are known and may estimate the self-position based on the positions of the three transmission apparatuses.

(6) In the above self-position estimation apparatus, when the number of the light emission signals available for a self-position calculation is two, the position calculation unit may select a fourth algorithm when positions of the two transmission apparatuses, an attitude of the self-position estimation apparatus, and an altitude of the self-position estimation apparatus are known and may estimate the self-position based on the positions of the two transmission apparatuses, the attitude of the self-position estimation apparatus, and the altitude of the self-position estimation apparatus.

(7) In the above self-position estimation apparatus, when the number of the light emission signals available for a self-position calculation is two, the position calculation unit may select a fifth algorithm when positions of the two transmission apparatuses, an attitude of the self-position estimation apparatus, and each distance between each of the two transmission apparatuses and the self-position estimation apparatus are known and may estimate the self-position based on the positions of the two transmission apparatuses, the attitude of the self-position estimation apparatus, and each distance between each of the two transmission apparatuses and the self-position estimation apparatus.

(8) In the above self-position estimation apparatus, when the number of the light emission signals available for a self-position calculation is two, the position calculation unit may select a sixth algorithm when positions of the two transmission apparatuses, an attitude of the self-position estimation apparatus, and each azimuth angle between each of the two transmission apparatuses and the self-position estimation apparatus are known and may estimate the self-position based on the positions of the two transmission apparatuses, the attitude of the self-position estimation apparatus, and each azimuth angle between each of the two transmission apparatuses and the self-position estimation apparatus.

(9) In the above self-position estimation apparatus, when the number of the light emission signals available for a self-position calculation is one, the position calculation unit may select a seventh algorithm when a position of the one transmission apparatus, an attitude of the self-position estimation apparatus, position information of a road on which a vehicle including the self-position estimation apparatus is traveling, and an elevation/depression angle between the transmission apparatus and the self-position estimation apparatus are known and may estimate the self-position based on the position of the one transmission apparatus, the attitude of the self-position estimation apparatus, the position information of the road on which the vehicle including the self-position estimation apparatus is traveling, and the elevation/depression angle between the transmission apparatus and the self-position estimation apparatus.

(10) In the above self-position estimation apparatus, when the number of the light emission signals available for a self-position calculation is one, the position calculation unit may select an eighth algorithm when a position of the one transmission apparatus, an attitude of the self-position estimation apparatus, position information of a road on which a vehicle including the self-position estimation apparatus is traveling, and a distance between the one transmission apparatus and the self-position estimation apparatus are known and may estimate the self-position based on the position of the one transmission apparatus, the attitude of the self-position estimation apparatus, the position information of the road on which the vehicle including the self-position estimation apparatus is traveling, and the distance between the one transmission apparatus and the self-position estimation apparatus.

(11) In the above self-position estimation apparatus, when the number of the light emission signals available for a self-position calculation is one, the position calculation unit may select a ninth algorithm when a position of the one transmission apparatus, an attitude of the self-position estimation apparatus, an azimuth angle of the self-position estimation apparatus, and an altitude of the self-position estimation apparatus are known and may estimate the self-position based on the position of the one transmission apparatus, the attitude of the self-position estimation apparatus, the azimuth angle of the self-position estimation apparatus, and the altitude of the self-position estimation apparatus.

(12) In the above self-position estimation apparatus, when the number of the light emission signals available for a self-position calculation is one, the position calculation unit may select a tenth algorithm when a position of the one transmission apparatus, an attitude of the self-position estimation apparatus, an azimuth angle of the self-position estimation apparatus, and a distance between the one transmission apparatus and the self-position estimation apparatus are known and may estimate the self-position based on the position of the one transmission apparatus, the attitude of the self-position estimation apparatus, the azimuth angle of the self-position estimation apparatus, and the distance between the one transmission apparatus and the self-position estimation apparatus.

(13) A self-position estimation method according to another aspect of the present invention includes: (a) by way of a light reception unit, receiving a light emission signal from a transmission apparatus via a pixel; (b) by way of a position calculation unit, selecting at least one, in accordance with the number of the light emission signals acquired in (a) and which are used for a calculation of a self-position, from a plurality of algorithms in which the self-position is estimated; and (c) by way of the position calculation unit, calculating the self-position by using the algorithm selected in (b).

According to the configuration (1) or (13) described above, it is possible to properly obtain a self-position even when the number of transmission signals available for a self-position calculation in an optical communication fluctuates.

According to the configuration (2) described above, it is possible to accurately estimate a self-position even when the number of transmission signals receivable and available for a self-position calculation is small.

According to the configuration (3) described above, it is possible to accurately estimate a self-position based on a plurality of self-positions calculated according to a plurality of algorithms.

According to the configuration (4) described above, even when four or more transmission signals are available for a self-position calculation, it is possible to select three or less transmission signals from the four or more transmission signals and select an algorithm based on the selected transmission signals. Thereby, according to the configuration (4) described above, even in a case where it is possible to receive four or more transmission signals, it is possible to accurately estimate a self-position.

According to the configuration (5) described above, when the number of transmission signals available for a self-position calculation is three, it is possible to estimate a self-position with high accuracy based on the three transmission signals which can be received.

According to the configuration (6) described above, when the number of transmission signals available for a self-position calculation is two, it is possible to estimate a self-position with high accuracy based on the positions of the two transmission apparatuses, the attitude of the self-position estimation apparatus, and the altitude of the self-position estimation apparatus. The attitude of the self-position estimation apparatus includes at least a pitch angle and a roll angle of the self-position estimation apparatus.

According to the configuration (7) described above, when the number of transmission signals available for a self-position calculation is two, it is possible to estimate a self-position with high accuracy based on the positions of the two transmission apparatuses, the attitude of the self-position estimation apparatus, and each distance between each of the two transmission apparatuses and the self-position estimation apparatus.

According to the configuration (8) described above, when the number of transmission signals available for a self-position calculation is two, it is possible to estimate a self-position with high accuracy based on the positions of the two transmission apparatuses, the attitude of the self-position estimation apparatus, and each azimuth angle between each of the two transmission apparatuses and the self-position estimation apparatus.

According to the configuration (9) described above, when the number of transmission signals available for a self-position calculation is one, it is possible to estimate a self-position with high accuracy based on the position of the one transmission apparatus, the attitude of the self-position estimation apparatus, the position information of the road on which the vehicle including the self-position estimation apparatus is traveling, and the elevation/depression angle between the transmission apparatus and the self-position estimation apparatus.

According to the configuration (10) described above, when the number of transmission signals available for a self-position calculation is one, it is possible to estimate a self-position with high accuracy based on the position of the one transmission apparatus, the attitude of the self-position estimation apparatus, the position information of the road on which the vehicle including the self-position estimation apparatus is traveling, and the distance between the one transmission apparatus and the self-position estimation apparatus.

According to the configuration (11) described above, when the number of transmission signals available for a self-position calculation is one, it is possible to estimate a self-position with high accuracy based on the position of the one transmission apparatus, the attitude of the self-position estimation apparatus, the azimuth angle of the self-position estimation apparatus, and the altitude of the self-position estimation apparatus.

According to the configuration (12) described above, when the number of transmission signals available for a self-position calculation is one, it is possible to estimate a self-position with high accuracy based on the position of the one transmission apparatus, the attitude of the self-position estimation apparatus, the azimuth angle of the self-position estimation apparatus, and the distance between the one transmission apparatus and the self-position estimation apparatus.

BRIEF DESCRIPTION OF THE DRAWINGS

FIG. 1 is a system configuration view representing a configuration of a communication system according to an embodiment.

FIG. 14 shows a ninth algorithm according to the embodiment.

FIG. 15 shows a tenth algorithm according to the embodiment.

DESCRIPTION OF THE EMBODIMENTS

Figure 2:
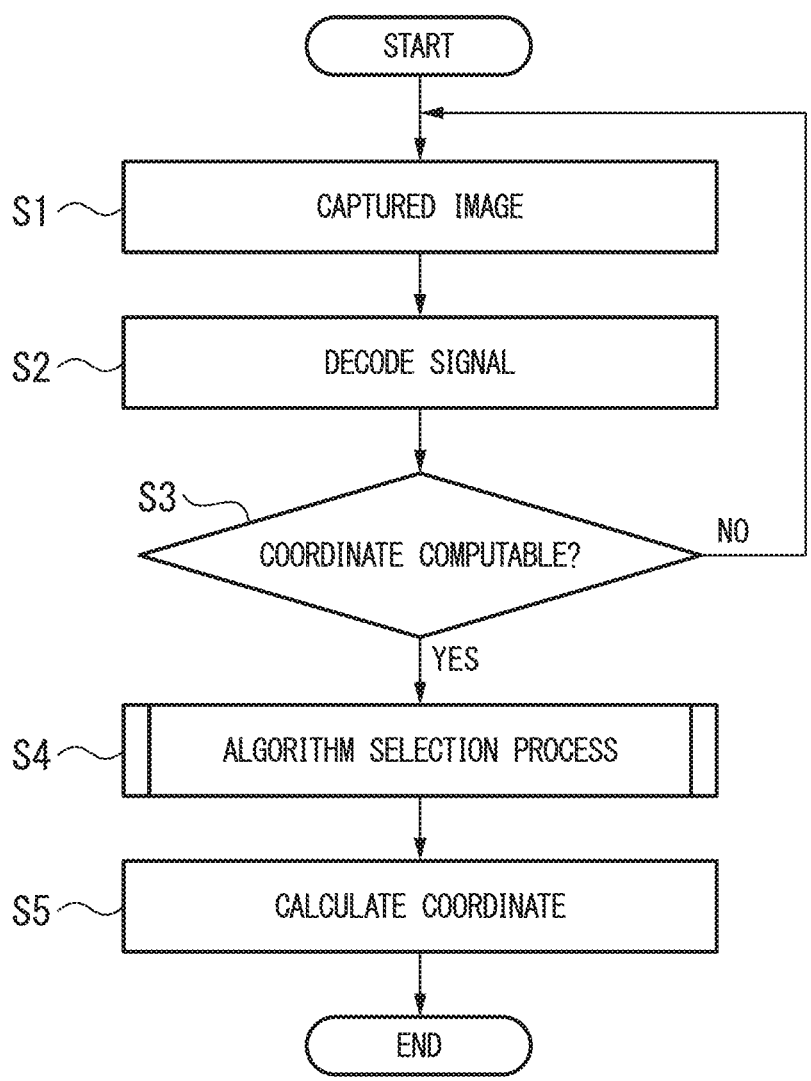
FIG. 2 is a flowchart of a process of the communication system according to the embodiment.

Hereinafter, an embodiment of the present invention is described with reference to the drawings.

FIG. 1 is a system configuration view representing a configuration of a communication system 1 according to the present embodiment. As shown in FIG. 1, the communication system 1 includes a self-position estimation apparatus 10, a first transmission apparatus 20-1, a second transmission apparatus 20-2, a third transmission apparatus 20-3, and the like. The following embodiment is described using an example in which the self-position estimation apparatus 10 is provided on a vehicle. In the following description, when one of the first transmission apparatus 20-1, the second transmission apparatus 20-2, the third transmission apparatus 20-3, and the like is not specified, the first transmission apparatus 20-1, the second transmission apparatus 20-2, the third transmission apparatus 20-3, and the like are simply referred to as a transmission apparatus 20.

As shown in FIG. 1, the self-position estimation apparatus 10 includes a lens 101, a light reception unit 102, a GNSS 103, an oscillator 104, a demodulator 105, a decoder 106, a control unit 107, an encoder 108, a modulator 109, a projector 110, a storage unit 111, a coordinate DB 112, a first coordinate search unit 113, a sensor unit 114, an attitude estimation unit 115, a relative displacement estimation unit 116, an imaging unit 117, a lane position measurement unit 118, a coordinate DB 119, a second coordinate search unit 120, and a position calculation unit 121. The sensor unit 114 includes an acceleration sensor 131, a rate sensor 132, and a distance meter 133. Each of the lens 101 and the light reception unit 102 of the self-position estimation apparatus 10 is provided at the front and at the rear with respect to the travel direction of the vehicle.

The transmission apparatus 20 includes a lens 201, a light reception unit 202, a GNSS 203, an oscillator 204, a demodulator 205, a decoder 206, a control unit 207, an encoder 208, a modulator 209, a projector 210, and a storage unit 211.

The transmission apparatus 20 is attached, for example, to a traffic light, a guardrail, an overpass, a pedestrian walkway, and another vehicle. The transmission apparatuses 20 encode a signal including an identifier (ID) by which the apparatus is identified, a time code, a synchronization class, and information and transmit an optical beacon which is the encoded transmission signal to each other at a predetermined time. The synchronization class is information indicating a frequency accuracy of the oscillator 104 of the self-position estimation apparatus 10 or the oscillator 204 of the transmission apparatus 20. In the present embodiment, for example, a frequency accuracy of a level synchronized with the GNSS 103 or the GNSS 203 is zero, a frequency accuracy of $10^{-10}$ or less is one, a frequency accuracy of more than $10^{-10}$ and $10^{-9}$ or less is two, and a frequency accuracy of $10^{-6}$ or more is three.

The self-position estimation apparatus 10 receives a transmission signal transmitted by the transmission apparatus 20 according to an optical communication. The self-position estimation apparatus 10 extracts information from the received transmission signal. The self-position estimation apparatus 10 calculates a distance between the transmission apparatus 20 and the vehicle on which the self-position estimation apparatus 10 is provided based on the received transmission signal.

First, the transmission apparatus 20 is described.

The lens 201 causes a light beam including phase modulation light which is a transmission signal emitted by the self-position estimation apparatus 10 and environment light to pass through the lens 201, and the lens 201 forms an image of the light beam that has passed through the lens 201 on the light reception unit 202. The transmission apparatus 20 may include an optical filter between the lens 201 and the light reception unit 202.

The light reception unit 202 has a structure in which a plurality of pixels are two-dimensionally arranged. The light reception unit 202 generates and accumulates an electric charge corresponding to the received light depending on the pixel and outputs, to the demodulator 205, the accumulated electric charge at a predetermined timing in response to the control of the control unit 207 as a reception signal.

The GNSS (Global Navigation Satellite System(s)) 203 is a positioning system using a satellite (not shown). The GNSS 203 extracts a reference signal from a signal received from the satellite and outputs the extracted reference signal to the oscillator 204.

The oscillator 204 corrects the generated synchronization signal corresponding to the reference signal input from the GNSS 203 and outputs the corrected synchronization signal to the modulator 209. Alternatively, the oscillator 204 generates the synchronization signal by using the reference signal output by the GNSS 203 and outputs the generated synchronization signal to the modulator 209. The oscillator 204 may receive the synchronization signal from another transmission apparatus 20 instead of the GNSS 203 according to a wired or wireless method and may oscillate.

The demodulator 205 performs demodulation with respect to the reception signal output by the light reception unit 202 corresponding to the modulation method used by the modulator 209 and outputs the demodulated reception signal to the decoder 206. The modulation method performed by the modulator 209 is, for example, a method such as the $2\pi/3$-DBPSK (Differential Binary Phase Shift Keying). The control of the pixel may be performed by the demodulator 205.

The decoder 206 decodes the reception signal demodulated by the demodulator 205 corresponding to the encoding used by the encoder 208 and outputs the decoded reception signal to the control unit 207.

The storage unit 211 stores the ID of the transmission apparatus 20, information used for modulation or encoding, and the like.

The control unit 207 controls the pixel included in the light reception unit 202. The control unit 207 controls the projector 210. The control unit 207 generates transmission information by using information stored by the storage unit 211 and outputs the generated transmission information to the encoder 208. The control unit 207 receives transmission information from the self-position estimation apparatus 10 output by the decoder 206 and extracts an ID, a time code, a synchronization class, and phase information of the carrier wave from the received transmission information. The control unit 207 acquires the delay time and the ID of the self-position estimation apparatus 10 output by the decoder 206. The control unit 207 outputs the delay time, the synchronization class, the time code, and the ID of the self-position estimation apparatus 10 to the encoder 208.

The encoder 208 encodes the transmission information output by the control unit 207 to generate a bit sequence.

The encoder 208 outputs the generated bit sequence to the modulator 209.

The modulator 209 modulates the bit sequence output by the encoder 208 by using the synchronization signal output by the oscillator 204, for example, in accordance with the DBPSK method to generate a carrier wave. The modulator 209 outputs the generated carrier wave to the projector 210. The modulation method performed by the modulator 209 is, for example, a method such as the $2\pi/3$-DBPSK (Differential Binary Phase Shift Keying). The modulation method performed by the modulator 209 is not limited to the $2\pi/3$-DBPSK modulation method.

The projector 210 performs phase modulation based on the carrier wave generated by the modulator 209 and transmits the phase modulation light which is a transmission signal applied with the phase modulation to the self-position estimation apparatus 10 corresponding to the control of the control unit 207. The projector 210 includes an LED (Light-Emitting Diode) or a laser diode capable of transmitting, for example, a visible light pulse having, for example, a high rate (repetition frequency). The projector 210 may include an LED or a laser diode transmitting an infrared light pulse having a high rate.

Next, the self-position estimation apparatus 10 is described.

The lens 101 causes a light beam including phase modulation light which is a transmission signal emitted by the transmission apparatus 20 and environment light to pass through the lens 101, and the lens 101 forms an image of the light beam that has passed through the lens 101 on the light reception unit 102. The self-position estimation apparatus 10 may include an optical filter between the lens 101 and the light reception unit 102.

The light reception unit 102 has a structure in which a plurality of pixels are two-dimensionally arranged. The number of the plurality of pixels is, for example, 1024×768 pixels. The light reception unit 102 generates an electric charge corresponding to the received light depending on the pixel and accumulates the generated electric charge at a predetermined timing in response to the control of the control unit 107. The light reception unit 102 outputs a signal based on the accumulated electric charge to the control unit 107. The signal includes at least the synchronization class, the time code, and the ID of the transmission apparatus 20.

The GNSS 103 extracts a reference signal from a signal received from the satellite and outputs the extracted reference signal to the oscillator 104. The GNSS 103 measures a position (latitude, longitude, altitude) based on the received signal and outputs the measured position information to the position calculation unit 121.

The oscillator 104 corrects the generated synchronization signal corresponding to the reference signal input from the GNSS 103 and outputs the corrected synchronization signal to the demodulator 105. Alternatively, the oscillator 104 generates the synchronization signal by using the reference signal output by the GNSS 103 and outputs the generated synchronization signal to the demodulator 105.

The demodulator 105 performs demodulation with respect to the reception signal output by the light reception unit 102 corresponding to the modulation method used by the modulator 209 of the transmission apparatus 20 and outputs the demodulated reception signal to the decoder 106. The control of the pixel may be performed by the demodulator 105.

The decoder 106 decodes the reception signal demodulated by the demodulator 105 corresponding to the encoding used by the encoder 208 of the transmission apparatus 20 and outputs the decoded reception signal to the control unit 107 and the first coordinate search unit 113.

The control unit 107 controls the pixel included in the light reception unit 102. The control unit 107 controls the projector 110. The control unit 107 generates transmission information by using information stored by the storage unit 111 and outputs the generated transmission information to the encoder 108. The control unit 107 receives transmission information from the transmission apparatus 20 that is output by the decoder 106 and extracts an ID, a time code, a synchronization class, information, and phase information of the carrier wave from the received transmission information. The control unit 107 sequentially stores the extracted information in the storage unit 111. The control unit 107 generates, in response to receiving the transmission information from the transmission apparatus 20, a signal including phase information at the time of reception, the ID of the terminal, the time code, and the synchronization class in modulation light having the same frequency as the frequency of the received carrier wave and outputs the generated signal to the encoder 108. The control unit 107 acquires the information, the delay time, the synchronization class, the time code, and the ID of the transmission apparatus 20 that is output by the decoder 106. The control unit 107 converts position information of the light reception unit which is a two-dimensional surface into angular information and then converts the position information into three-dimensional position information also by using distance information to obtain three-dimensional relative position information between vehicles.

The encoder 108 uses the signal output by the control unit 107 as transmission information and encodes the transmission information to generate a bit sequence. The encoder 108 outputs the generated bit sequence to the modulator 109.

The modulator 109 modulates the bit sequence output by the encoder 108 by using the synchronization signal output by the oscillator 104, for example, in accordance with the DBPSK method to generate a carrier wave. The modulator 109 outputs the generated carrier wave to the projector 110.

The projector 110 performs phase modulation based on the carrier wave generated by the modulator 109 and transmits the phase modulation light which is a transmission signal applied with the phase modulation to the transmission apparatus 20 corresponding to the control of the control unit 107. The projector 110 includes an LED or a laser diode capable of transmitting, for example, a visible light pulse having, for example, a high rate (repetition frequency). The projector 110 may include an LED or a laser diode transmitting an infrared light pulse having a high rate.

The storage unit 111 stores the ID of the self-position estimation apparatus 10, the delay time of the self-position estimation apparatus 10, the time code of the self-position estimation apparatus 10, the ID of the transmission apparatus 20, the delay time of the transmission apparatus 20, the time code of the transmission apparatus 20, the synchronization error, and information required for encoding, modulation, decoding, and demodulation. The storage unit 111 stores the result of calibration imaged via the light reception unit 102. The calibration is described below.

The coordinate DB 112 is a database that stores position information (latitude, longitude, altitude) at which the transmission apparatus 20 is provided in association with the ID of the transmission apparatus 20. Hereinafter, in the present embodiment, the latitude direction is an x-axis direction, the longitude direction is a y-axis direction, and the altitude direction is a z-axis direction. The self-position estimation apparatus 10 may not include the coordinate DB 112. In this case, the coordinate DB 112 may be included in a server apparatus (not shown), and the self-position estimation apparatus 10 and the server apparatus may be connected to each other via a network.

The first coordinate search unit 113 extracts the ID of the transmission apparatus 20 from the reception signal output by the decoder 106. The first coordinate search unit 113 searches position information that corresponds to the extracted ID of the transmission apparatus 20 in the coordinate DB 112 and outputs the searched position information in association with the ID of the transmission apparatus 20 to the position calculation unit 121.

The sensor unit 114 detects the state of the self-position estimation apparatus 10 and outputs the detected detection result to the attitude estimation unit 115 and the relative displacement estimation unit 116. The state of the self-position estimation apparatus 10 is information indicating acceleration, an angular velocity, and a movement distance in the self-position estimation apparatus 10.

The acceleration sensor 131 is, for example, a triaxial sensor. The acceleration sensor 131 detects acceleration in XYZ directions in the self-position estimation apparatus 10 and outputs the information indicating the detected acceleration to the attitude estimation unit 115.

The rate sensor 132 is a gyro sensor. The rate sensor 132 detects an angular velocity of the self-position estimation apparatus 10 and outputs the information indicating the detected angular velocity to the attitude estimation unit 115.

The distance meter 133 measures the movement distance of the vehicle including the self-position estimation apparatus 10 and outputs the information indicating the measured movement distance to the relative displacement estimation unit 116.

The attitude estimation unit 115 detects a pitch angle, a roll angle, and a yaw angle by using the information indicating the acceleration output by the acceleration sensor 131 and the information indicating the angular velocity output by the rate sensor 132. The attitude estimation unit 115 outputs the information indicating the detected pitch angle, the information indicating the detected roll angle, and the information indicating the detected yaw angle to the relative displacement estimation unit 116.

The relative displacement estimation unit 116 acquires the information indicating the pitch angle that is output by the attitude estimation unit 115, the information indicating the roll angle that is output by the attitude estimation unit 115, the information indicating the yaw angle that is output by the attitude estimation unit 115, and the information indicating the movement distance that is output by the distance meter 133. The relative displacement estimation unit 116 performs an inertial navigation by integrating the angles output by the attitude estimation unit 115 and the movement distances output by the distance meter 133. The relative displacement estimation unit 116 estimates the current position and attitude from the self-position and attitude detected last time and outputs the information indicating the estimated position and the information indicating the estimated attitude to the position calculation unit 121. The information indicating the attitude includes at least the pitch angle and the roll angle.

The imaging unit 117 is attached, for example, to the front of the vehicle. The imaging unit 117 captures a front image of the vehicle and outputs the captured image to the lane position measurement unit 118. The captured image includes, for example, the transmission apparatus 20, the lane of a road, and the like.

The lane position measurement unit 118 detects a white line, for example, according to a method disclosed in Japanese Unexamined Patent Application, First Publication No. H11-219435 from the captured image output by the imaging unit 117 and calculates a coordinate on a pixel that corresponds to the white line. The lane position measurement unit 118 outputs the calculated coordinate on the pixel that corresponds to the white line to the second coordinate search unit 120.

The coordinate DB 119 stores the structure or the position of the road as data in a predetermined format. For example, the coordinate DB 119 stores data in which the center line of a road is measured for each meter at the latitude, the longitude, and the altitude. The self-position estimation apparatus 10 may not include the coordinate DB 119. In this case, the coordinate DB 119 may be included in a server apparatus (not shown), and the self-position estimation apparatus 10 and the server apparatus may be connected to each other via a network.

The second coordinate search unit 120 searches the data stored in the coordinate DB 119 and obtains a coordinate (latitude, longitude, altitude) of the lane (white line) by using the coordinate on the pixel that corresponds to the white line output by the second coordinate search unit 120. The second coordinate search unit 120 outputs the obtained coordinate of the lane to the position calculation unit 121.

The position calculation unit 121 acquires the position information output by the GNSS 103, the information indicating the position output by the relative displacement estimation unit 116, the information indicating the attitude output by the relative displacement estimation unit 116, the information in which the position information output by the first coordinate search unit 113 is associated with the ID of the transmission apparatus 20, and the coordinate of the lane that is output by the second coordinate search unit 120. The position calculation unit 121 selects an algorithm used for calculating the current position based on the acquired information. The position calculation unit 121 calculates the current position by using the selected algorithm. The selection of algorithm and the calculation method of the current position are described later.

<Process of Communication System 1>

Next, an example of a process sequence of the communication system 1 is described.

FIG. 2 is a flowchart of a process of the communication system 1 according to the present embodiment.

(Step S1) The transmission apparatus 20 transmits a transmission signal. Subsequently, the control unit 107 of the self-position estimation apparatus 10 captures an image of the front of a vehicle 12 by controlling the imaging unit 117 while acquiring an image including the transmission signal according to exposing.

(Step S2) The control unit 107 acquires a signal output by the decoder 106 and decodes the acquired signal. The decoding of the signal may be performed by the decoder 106.

(Step S3) The control unit 107 determines whether or not the coordinate of the current position is computable based on the acquired image and the captured image. When the control unit 107 determines that the coordinate of the current position is computable (Step S3; YES), the control unit 107 causes the process to proceed to Step S4. When the control unit 107 determines that the coordinate of the current position is not computable (Step S3; NO), the control unit 107 causes the process to return to Step S1.

(Step S4) The position calculation unit 121 performs an algorithm selection process used for calculating the coordinate of the current position based on the image and information acquired by the light reception unit 102 and the image captured by the imaging unit 117.

(Step S5) The position calculation unit 121 calculates the coordinate of the current position by using the algorithm selected in Step S4.

<Algorithm Selection>

Next, an example of an algorithm selection sequence performed in Step S4 of FIG. 2 performed by the position calculation unit 121 is described.

Figure 3:
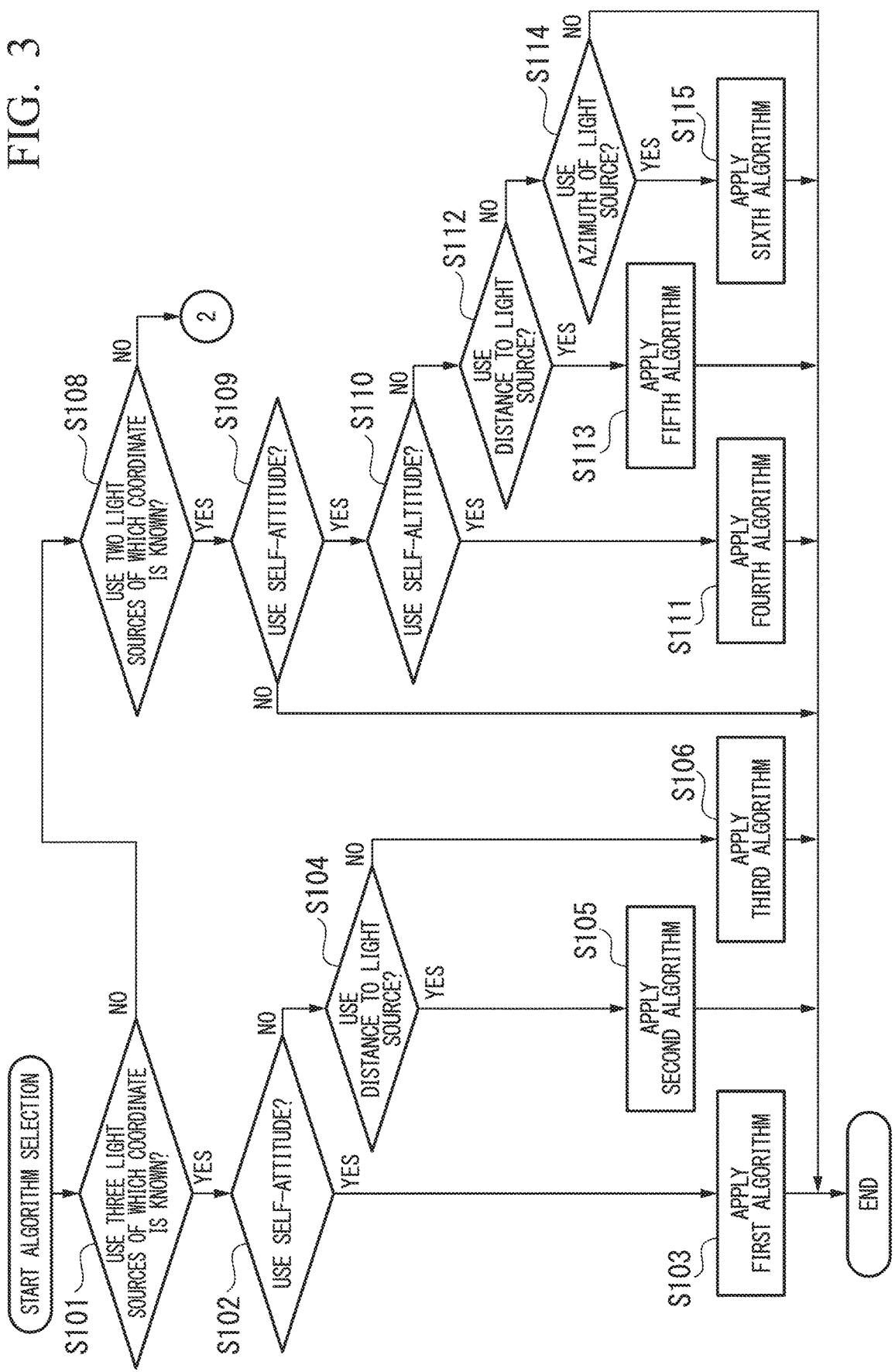
FIG. 3 is a flowchart of algorithm selection according to the embodiment.
Figure 4:
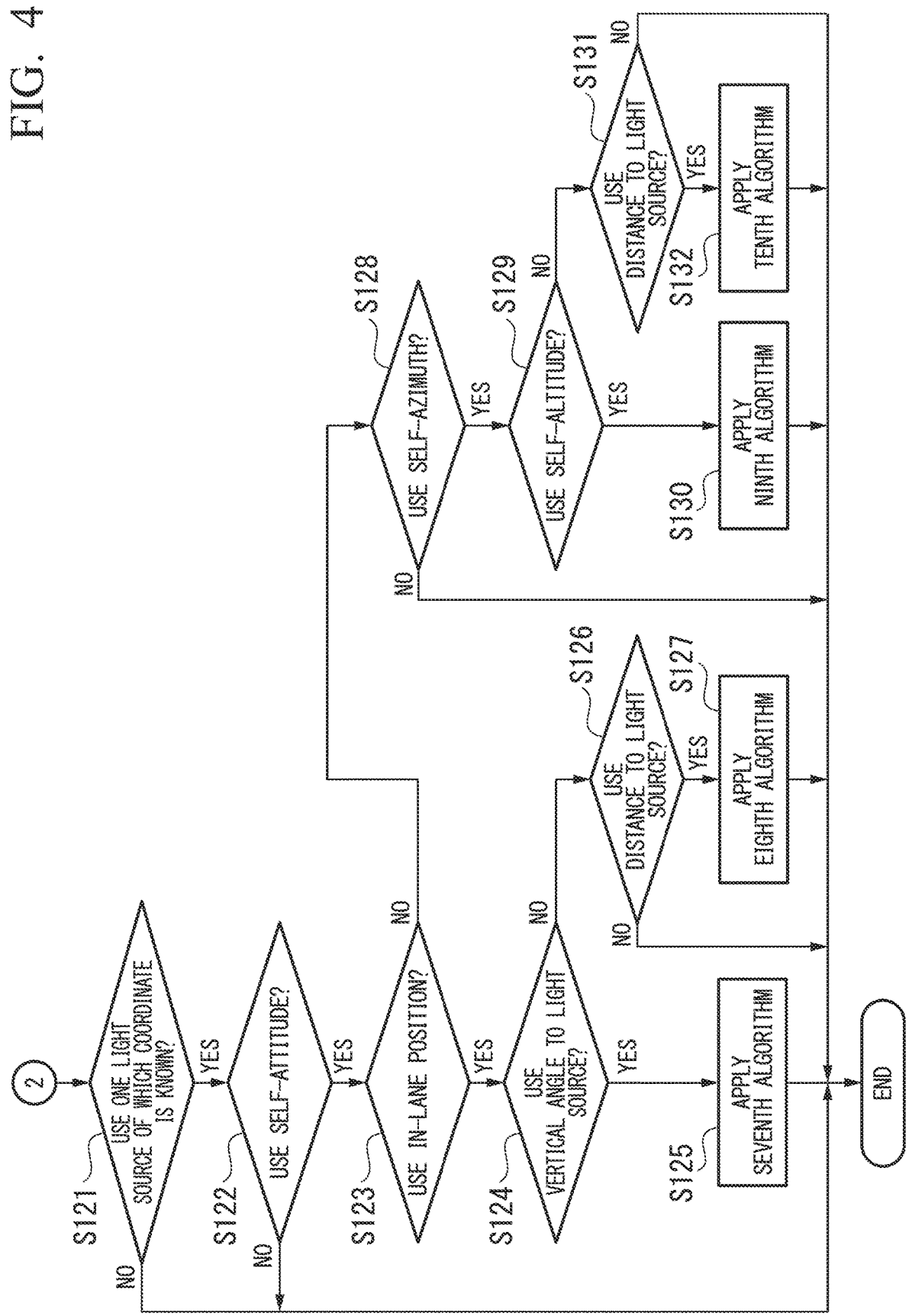
FIG. 4 is a flowchart of algorithm selection according to the embodiment.

FIG. 3 and FIG. 4 are flowcharts of algorithm selection according to the present embodiment.

(Step S101) The position calculation unit 121 determines whether or not three light sources of which the coordinate is known are used for calculating the current position. The position calculation unit 121 determines whether or not three light sources of which the coordinate is known are used for calculating the current position by using, for example, at least one of the number of light source images that can be acquired in Step S1 (FIG. 2), the signal output level of the light source that can be acquired, and the luminance level of the signal that can be acquired. When the position calculation unit 121 determines that three light sources of which the coordinate is known are used for calculating the current position (Step S101; YES), the position calculation unit 121 causes the process to proceed to Step S102. When the position calculation unit 121 determines that three light sources of which the coordinate is known are not used for calculating the current position (Step S101; NO), the position calculation unit 121 causes the process to proceed to Step S108.

(Step S102) The position calculation unit 121 determines whether or not self-attitude information is used for calculating the current position. The self-attitude is the attitude of the vehicle. The position calculation unit 121 uses the pitch angle and the roll angle of the angles output by the attitude estimation unit 115. When the position calculation unit 121 determines that self-attitude information is used for calculating the current position (Step S102; YES), the position calculation unit 121 causes the process to proceed to Step S103. When the position calculation unit 121 determines that self-attitude information is not used for calculating the current position (Step S102; NO), the position calculation unit 121 causes the process to proceed to Step S104.

(Step S103) The position calculation unit 121 determines that a first algorithm is applied to the algorithm used for calculating the coordinate of the current position. The first algorithm is described below.

(Step S104) The position calculation unit 121 determines whether or not distance information to the light source is used for calculating the current position. When the position calculation unit 121 determines that distance information to the light source is used for calculating the current position (Step S104; YES), the position calculation unit 121 causes the process to proceed to Step S105. When the position calculation unit 121 determines that distance information to the light source is not used for calculating the current position (Step S104; NO), the position calculation unit 121 causes the process to proceed to Step S106.

(Step S105) The position calculation unit 121 determines that a second algorithm is applied to the algorithm used for calculating the coordinate of the current position. The second algorithm is described below.

(Step S106) The position calculation unit 121 determines that a third algorithm is applied to the algorithm used for calculating the coordinate of the current position. The third algorithm is described below.

(Step S108) The position calculation unit 121 determines whether or not two light sources of which the coordinate is known are used for calculating the current position. The position calculation unit 121 determines whether or not two light sources of which the coordinate is known are used for calculating the current position by using, for example, at least one of the number of light source images that can be acquired in Step S1 (FIG. 2), the signal output level of the light source that can be acquired, and the luminance level of the signal that can be acquired. When the position calculation unit 121 determines that two light sources of which the coordinate is known are used for calculating the current position (Step S108; YES), the position calculation unit 121 causes the process to proceed to Step S109. When the position calculation unit 121 determines that two light sources of which the coordinate is known are not used for calculating the current position (Step S108; NO), the position calculation unit 121 causes the process to proceed to Step S121 (FIG. 4).

(Step S109) The position calculation unit 121 determines whether or not self-attitude information is used for calculating the current position. When the position calculation unit 121 determines that self-attitude information is used for calculating the current position (Step S109; YES), the position calculation unit 121 causes the process to proceed to Step S110. When the position calculation unit 121 determines that self-attitude information is not used for calculating the current position (Step S109; NO), the position calculation unit 121 causes the process to terminate.

(Step S110) The position calculation unit 121 determines whether or not self-altitude information is used for calculating the current position. When the position calculation unit 121 determines that self-altitude information is used for calculating the current position (Step S110; YES), the position calculation unit 121 causes the process to proceed to Step S111. When the position calculation unit 121 determines that self-altitude information is not used for calculating the current position (Step S110; NO), the position calculation unit 121 causes the process to proceed to Step S112. The position calculation unit 121 extracts the altitude from the position information output by the GNSS 103.

(Step S111) The position calculation unit 121 determines that a fourth algorithm is applied to the algorithm used for calculating the coordinate of the current position. The fourth algorithm is described below.

(Step S112) The position calculation unit 121 determines whether or not distance information to the transmission apparatus 20, which is a light source, is used for calculating the current position. When the position calculation unit 121 determines that distance information to a light source is used for calculating the current position (Step S112; YES), the position calculation unit 121 causes the process to proceed to Step S113. When the position calculation unit 121 determines that distance information to a light source is not used for calculating the current position (Step S112; NO), the position calculation unit 121 causes the process to proceed to Step S114.

(Step S113) The position calculation unit 121 determines that a fifth algorithm is applied to the algorithm used for calculating the coordinate of the current position. The fifth algorithm is described below.

(Step S114) The position calculation unit 121 determines whether or not azimuth information to the transmission apparatus 20, which is a light source, is used for calculating the current position. When the position calculation unit 121 determines that azimuth information to a light source is used for calculating the current position (Step S114; YES), the position calculation unit 121 causes the process to proceed to Step S115. When the position calculation unit 121 determines that azimuth information to a light source is not used for calculating the current position (Step S114; NO), the position calculation unit 121 causes the process to terminate.

(Step S115) The position calculation unit 121 determines that a sixth algorithm is applied to the algorithm used for calculating the coordinate of the current position. The sixth algorithm is described below.

Description is continued with reference to FIG. 4.

(Step S121) The position calculation unit 121 determines whether or not a single light source of which the coordinate is known is used for calculating the current position. The position calculation unit 121 determines whether or not a single light source of which the coordinate is known is used for calculating the current position by using, for example, at least one of the number of light source images that can be acquired in Step S1 (FIG. 2), the signal output level of the light source that can be acquired, and the luminance level of the signal that can be acquired. When the position calculation unit 121 determines that a single light source of which the coordinate is known is used for calculating the current position (Step S121; YES), the position calculation unit 121 causes the process to proceed to Step S122. When the position calculation unit 121 determines that a single light source of which the coordinate is known is not used for calculating the current position (Step S121; NO), the position calculation unit 121 causes the process to terminate.

(Step S122) The position calculation unit 121 determines whether or not self-attitude information is used for calculating the current position. When the position calculation unit 121 determines that self-attitude information is used for calculating the current position (Step S122; YES), the position calculation unit 121 causes the process to proceed to Step S123. When the position calculation unit 121 determines that self-attitude information is not used for calculating the current position (Step S122; NO), the position calculation unit 121 causes the process to terminate.

(Step S123) The position calculation unit 121 determines whether or not in-lane position information is used for calculating the current position. When the position calculation unit 121 determines that in-lane position information is used for calculating the current position (Step S123; YES), the position calculation unit 121 causes the process to proceed to Step S124. When the position calculation unit 121 determines that in-lane position information is not used for calculating the current position (Step S123; NO), the position calculation unit 121 causes the process to proceed to Step S128.

(Step S124) The position calculation unit 121 determines whether or not elevation/depression angle (also referred to as vertical angle) information to the transmission apparatus 20, which is a light source, is used for calculating the current position. When the position calculation unit 121 determines that elevation/depression angle information to a light source is used for calculating the current position (Step S124; YES), the position calculation unit 121 causes the process to proceed to Step S125. When the position calculation unit 121 determines that elevation/depression angle information to a light source is not used for calculating the current position (Step S124; NO), the position calculation unit 121 causes the process to proceed to Step S126. In the present embodiment, the elevation/depression angle is an incidence angle from a light source in a vertical direction with respect to a plane to which the vehicle is traveling.

(Step S125) The position calculation unit 121 determines that a seventh algorithm is applied to the algorithm used for calculating the coordinate of the current position. The seventh algorithm is described below.

(Step S126) The position calculation unit 121 determines whether or not distance information to the transmission apparatus 20, which is a light source, is used for calculating the current position. When the position calculation unit 121 determines that distance information to a light source is used for calculating the current position (Step S126; YES), the position calculation unit 121 causes the process to proceed to Step S127. When the position calculation unit 121 determines that distance information to a light source is not used for calculating the current position (Step S126; NO), the position calculation unit 121 causes the process to terminate.

(Step S127) The position calculation unit 121 determines that an eighth algorithm is applied to the algorithm used for calculating the coordinate of the current position. The eighth algorithm is described below.

(Step S128) The position calculation unit 121 determines whether or not self-azimuth information is used for calculating the current position. When the position calculation unit 121 determines that self-azimuth information is used for calculating the current position (Step S128; YES), the position calculation unit 121 causes the process to proceed to Step S129. When the position calculation unit 121 determines that self-azimuth information is not used for calculating the current position (Step S128; NO), the position calculation unit 121 causes the process to terminate.

(Step S129) The position calculation unit 121 determines whether or not self-altitude information is used for calculating the current position. When the position calculation unit 121 determines that self-altitude information is used for calculating the current position (Step S129; YES), the position calculation unit 121 causes the process to proceed to Step S130. When the position calculation unit 121 determines that self-altitude information is not used for calculating the current position (Step S129; NO), the position calculation unit 121 causes the process to proceed to Step S131.

(Step S130) The position calculation unit 121 determines that a ninth algorithm is applied to the algorithm used for calculating the coordinate of the current position. The ninth algorithm is described below.

(Step S131) The position calculation unit 121 determines whether or not distance information to the transmission apparatus 20, which is a light source, is used for calculating the current position. When the position calculation unit 121 determines that distance information to a light source is used for calculating the current position (Step S131; YES), the position calculation unit 121 causes the process to proceed to Step S132. When the position calculation unit 121 determines that distance information to a light source is not used for calculating the current position (Step S131; NO), the position calculation unit 121 causes the process to terminate.

(Step S132) The position calculation unit 121 determines that a tenth algorithm is applied to the algorithm used for calculating the coordinate of the current position. The tenth algorithm is described below.

Finally, the position calculation unit 121 causes the algorithm selection process to terminate.

The position calculation unit 121 may use the information indicating the current position output by the relative displacement estimation unit 116 and the information indicating the current attitude output by the relative displacement estimation unit 116 as an initial value and perform the algorithm selection process described above to thereby shorten the convergence time. The position calculation unit 121 may select a plurality of algorithms and select one of current positions P of the vehicle as a solution calculated from each algorithm. Alternatively, when a plurality of solutions can be obtained, the position calculation unit 121 may select one of the solutions in accordance with a preset priority. Alternatively, when a plurality of solutions can be obtained, the position calculation unit 121 may calculate an average value of the plurality of solutions. Alternatively, the position calculation unit 121 may select a plurality of algorithms and use a predetermined weighting value for the obtained solutions to calculate an average value. Alternatively, the position calculation unit 121 may select a plurality of algorithms and perform clustering with respect to the obtained solutions by using, for example, a k-average algorithm. The position calculation unit 121 may exclude, based on a result of performing clustering, data which is out of clusters because the data includes much noise and is inappropriate.

In the example described above, the position calculation unit 121 may determine which information is used or is not used by using the obtained information. The position calculation unit 121 may select and use information which satisfies a predetermined basis (for example, luminance, signal SN ratio, time while a signal is continuously obtained) from the obtained information.

As described above, according to the present embodiment, an algorithm that is capable of calculating the current position is selected by using the information (the image captured via the light reception unit 102, the detection value detected by the sensor unit 114, the image captured by the imaging unit 117, the information acquired by the GNSS 103) acquired by the self-position estimation apparatus 10. Thereby, according to the present embodiment, the position can be calculated even when the number of light sources is two or one although the position cannot be calculated when the number of light sources is less than three in the related art. That is, according to the present embodiment, it is possible to properly obtain a self-position even when the number of transmission signals available for a self-position calculation in an optical communication fluctuates.

The above embodiment is described using an example in which one to three transmission signals from the transmission apparatus 20, which is a light source, are obtained; however, the embodiment is not limited thereto. The number of obtained transmission signals from a light source may be four or more. In this case, for example, the position calculation unit 121 may select and use three transmission signals from the four or more transmission signals in the order of a shorter distance. Alternatively, the position calculation unit 121 may select one to three transmission signals from the four or more transmission signals, may calculate current positions for each algorithm by using the selected transmission signals, and may perform, as described above, selection based on a predetermined priority, calculation of an average value, calculation of an average value after weighting, a clustering process, and the like by using the calculated values.

As described above, according to the present embodiment, it is possible to accurately estimate a self-position based on a plurality of self-positions calculated according to a plurality of algorithms.

Further, according to the present embodiment, even when four or more transmission signals are available for a self-position calculation, it is possible to select three or less transmission signals from the four or more transmission signals and select an algorithm based on the selected transmission signals. Thereby, according to the present embodiment, even in a case where it is possible to receive four or more transmission signals, it is possible to accurately estimate a self-position.

<Calculation of Distance Between Transmission Apparatus 20 and Vehicle 12 Including Self-Position Estimation Apparatus 10>

Next, a calculation method of the distance between the transmission apparatus 20 and the vehicle 12 including the self-position estimation apparatus 10 is described.

Figure 5:
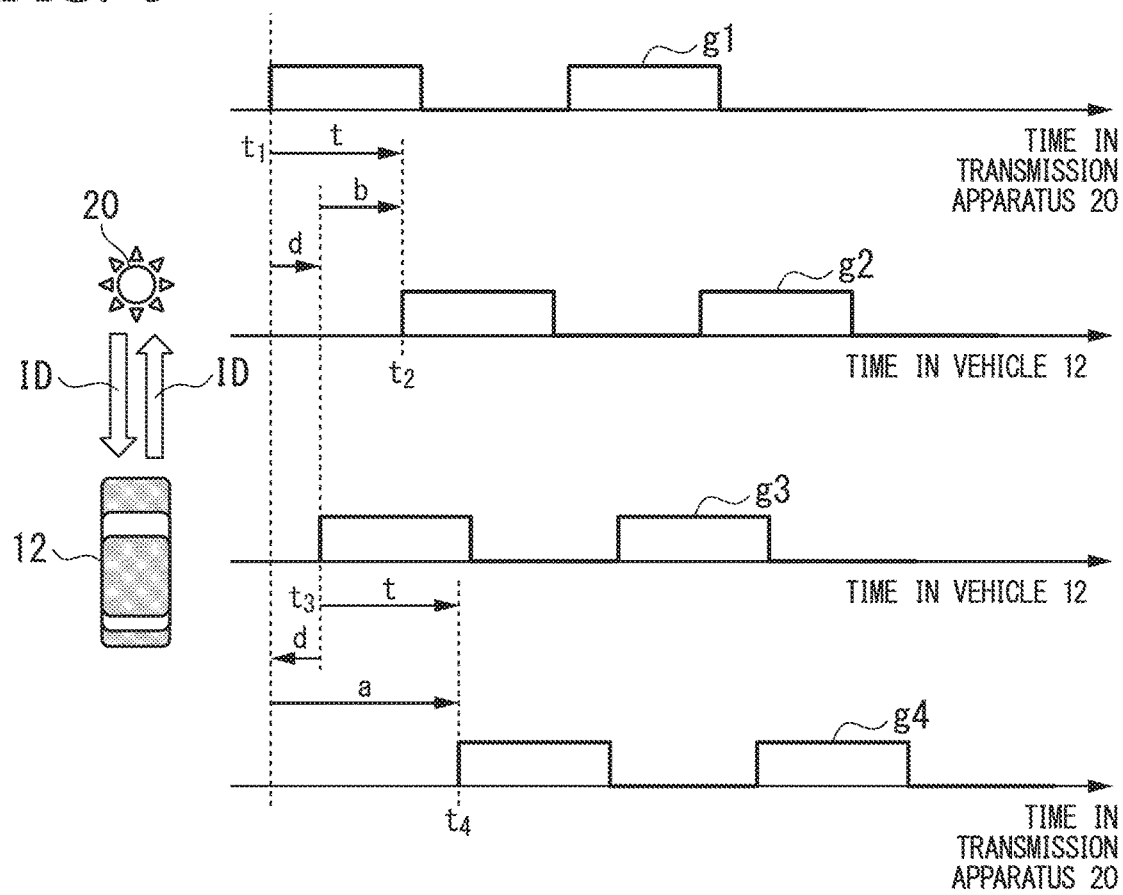
FIG. 5 is a view showing a mutual communication between a transmission apparatus and a vehicle on which a self-position estimation apparatus is provided according to the embodiment.

FIG. 5 is a view showing a mutual communication between the transmission apparatus 20 and the vehicle 12 including the self-position estimation apparatus 10 according to the present embodiment. In FIG. 5, the vertical axis represents whether the signal is a H (high) level or is a L (low) level, and the horizontal axis represents time. In the example shown in FIG. 5, the transmission apparatus 20 is provided in front of the vehicle 12 with respect to the travel direction of the vehicle 12.

A waveform g1 represents a transmission signal emitted by the transmission apparatus 20. A waveform g2 represents a reception signal received by the self-position estimation apparatus 10 of the vehicle 12 of the transmission signal emitted by the transmission apparatus 20. A waveform g3 represents a transmission signal emitted by the self-position estimation apparatus 10 of the vehicle 12. A waveform g4 represents a reception signal received by the transmission apparatus 20 of the transmission signal emitted by the self-position estimation apparatus 10 of the vehicle 12.

A time $t_1$ represents the timing when the transmission apparatus 20 emits light. A time $t_2$ represents the timing when the self-position estimation apparatus 10 of the vehicle 12 receives the light emitted by the transmission apparatus 20. A time $t_3$ represents the timing when the self-position estimation apparatus 10 of the vehicle 12 emits light. A time $t_4$ represents the timing when the transmission apparatus 20 receives the light emitted by the self-position estimation apparatus 10 of the vehicle 12.

Further, "t" represents a true delay time. "b" represents a delay time measured by using a reference time of the self-position estimation apparatus 10 of the vehicle 12. "d" represents a synchronization error. In the present embodiment, the synchronization error is also referred to as a phase error. "a" represents a delay time measured by using a reference time of the transmission apparatus 20. In the present embodiment, "a" and "b" are also referred to as an apparent delay time.

As shown in FIG. 5, the true delay time t is represented by the following Expression (1) and Expression (2).

$$b+d=t \quad (1)$$

$$a-d=t \quad (2)$$

According to Expression (1) and Expression (2), a+b=2t is obtained, and the true delay time t is represented by the following Expression (3). According to Expression (1) and Expression (2), the synchronization error d is represented by the following Expression (4).

$$t=(a+b)/2 \quad (3)$$

$$d=(a-b)/2 \quad (4)$$

The transmission signal is a light signal, and therefore, an inter-vehicle distance L between the transmission apparatus 20 and the self-position estimation apparatus 10 of the vehicle 12 can be obtained by conversion using the following Expression (5). In Expression (5), "c" is the speed of light (299,792,458 [m/s]).

$$L=t \cdot c \quad (5)$$

In this way, by transmitting the apparent delay times (a, b) to each other between the transmission apparatus 20 and the self-position estimation apparatus 10, the self-position estimation apparatus 10 can calculate the distance between the transmission apparatus 20 and the vehicle 12. Then, the self-position estimation apparatus 10 can calculate the true delay time t according to Expression (1) or Expression (2) by using the calculated synchronization error d and the apparent delay time obtained for each optical communication. The self-position estimation apparatus 10 transmits and receives the apparent delay time and the synchronization error via the projector 110 and the light reception unit 102 according to an optical communication. When the self-position estimation apparatus 10 and the transmission apparatus 20 include a wireless communication unit (not shown), the self-position estimation apparatus 10 and the transmission apparatus 20 may transmit and receive the apparent delay time and the synchronization error according to a wireless communication.

In the following description, a position A of the first transmission apparatus 20-1 is $(X_1, Y_1, Z_1)$, a position B of the second transmission apparatus 20-2 is $(X_2, Y_2, Z_2)$, a position C of the third transmission apparatus 20-3 is $(X_3, Y_3, Z_3)$, and a position P of the vehicle 12 is $(X_P, Y_P, Z_P)$. In the present embodiment, the self-position of the vehicle 12 including the self-position estimation apparatus 10 is the origin, the north direction is the x-axis direction, the east direction is the y-axis direction, and the altitude direction is the z-axis direction.

<Incidence Angle of Light Ray from Light Source>

A calculation method of the incidence angle of a light ray from the transmission apparatus 20, which is a light source, is described.

Figure 6:
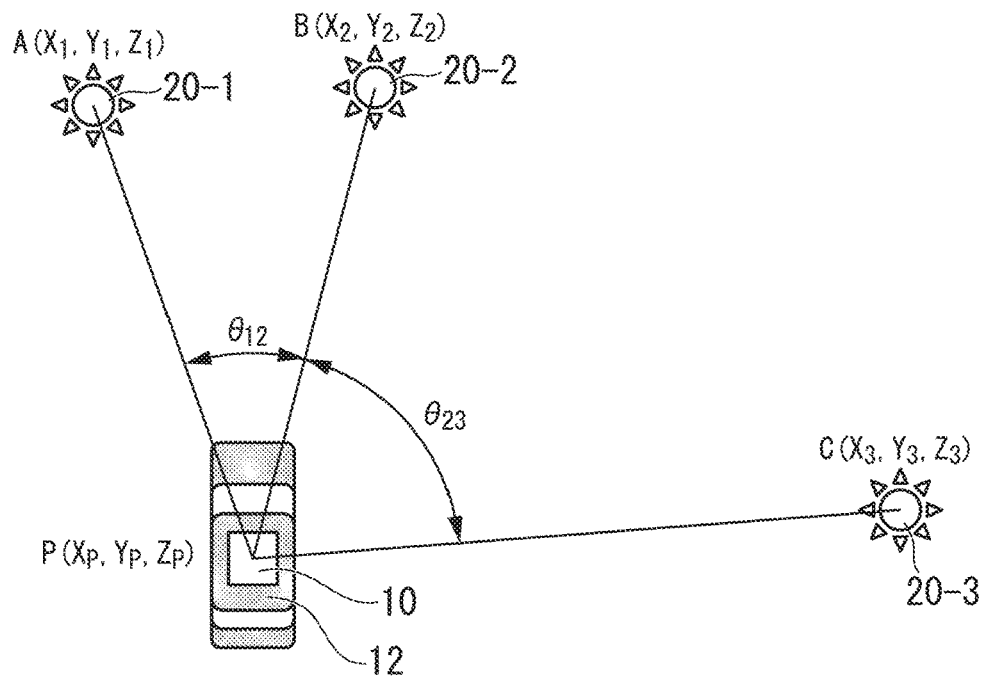
FIG. 6 shows a first algorithm according to the embodiment.

FIG. 6 shows a first algorithm according to the present embodiment.

In the present embodiment, for example, the self-position estimation apparatus 10 preliminarily images a transmission signal from a light source of which the position of the light source and the angle of the incident light ray are known according to exposing using the light reception unit 102. The angle is a pan angle and a tilt angle in the polar coordinate. The control unit 107 stores the coordinate in all pixels in which the light source is imaged as a result of imaging in association with the angle at the time of imaging in the storage unit 111. In the present embodiment, such a process is also referred to as a camera calibration.

For example, a method disclosed in Japanese Patent No. 3906123 or a method disclosed in Japanese Patent No. 4077755 is used for the camera calibration.

The control unit 107 extracts the coordinate (position) of the transmission signal transmitted from the light source from the image captured when the vehicle travels or is stopped. For example, when the light source is captured at a coordinate (100, 200) on the image, the position and direction of the incident light ray which become the image position are known in advance according to the camera calibration. The control unit 107 obtains the direction of the light source as corresponding angle information such as (−20°, +10°) in the polar coordinate (pan angle, tilt angle) with reference to the information that is stored by the storage unit 111 and that corresponds to the coordinate (100, 200). The control unit 107 similarly obtains the direction of the transmission apparatus 20 which is another light source to thereby calculate $\theta_{12}$ and $\theta_{23}$ as a relative angle and outputs information indicating the calculated angle to the position calculation unit 121.

<First Algorithm>

Next, the first algorithm is described using FIG. 6. In the first algorithm, a method of resection is used.

In the first algorithm, the position of each of the first transmission apparatus 20-1 to the third transmission apparatus 20-3, which are three light sources, is known. The position P of the vehicle 12 including the self-position estimation apparatus 10 is unknown.

First, the control unit 107 extracts the coordinate of each light source from the image captured by the light reception unit 102 and calculates $\theta_{12}$ (=∠APB) and $\theta_{23}$ (=∠BPC) by using the extracted coordinate with reference to the information stored by the storage unit 111.

The equation of a circumcircle of the triangle ΔABP having vertexes ABP is represented by the following Expression (6) using $X_1$, $Y_1$, $X_2$, $Y_2$, and $\theta_{12}$. The radius of the circle is $R_O$.

$$(X - X_{oa})^2 + (Y - Y_{oa})^2 = R_O^2 \quad (6)$$

$$\text{Here } R_O = \frac{\sqrt{(X_2 - X_1)^2 + (Y_2 - Y_1)^2}}{2\sin(\theta_{12})},$$

$$X_{oa} = \frac{X_1 + X_2}{2} + R\sin(\phi_1),$$

$$Y_{oa} = \frac{Y_1 + Y_2}{2} - R\cos(\phi_1),$$

$$\tan(\phi_1) = \frac{Y_2 - Y_1}{X_2 - X_1}$$

In Expression (6), $^{SM}_1$ is the gradient of a line segment AB.

The equation of a circumcircle of the triangle ΔBCP having vertexes BCP is represented by the following Expression (7) using $X_1$, $Y_1$, $X_2$, $Y_2$, and $\theta_{23}$. The radius of the circle is $R_Q$.

$$(X - X_{oc})^2 + (Y - Y_{oc})^2 = R_Q^2 \quad (7)$$

$$\text{Here } R_Q = \frac{\sqrt{(X_3 - X_2)^2 + (Y_3 - Y_2)^2}}{2\sin(\theta_{23})},$$

$$X_{oc} = \frac{X_2 + X_3}{2} + R\sin(\phi_2),$$

$$Y_{oc} = \frac{Y_2 + Y_3}{2} + R\cos(\phi_2),$$

$$\tan(\phi_2) = \frac{Y_3 - Y_2}{X_3 - X_2}$$

In Expression (7), $^{SM}_2$ is the gradient of a line segment BC.

The position calculation unit 121 obtains the intersection point between the circumcircle of the triangle ΔABP and the circumcircle of the triangle ΔBCP and determines that an intersection point other than B is P to thereby obtain the coordinate of the position P ($X_P$, $Y_P$).

<Second Algorithm>

Figure 7:
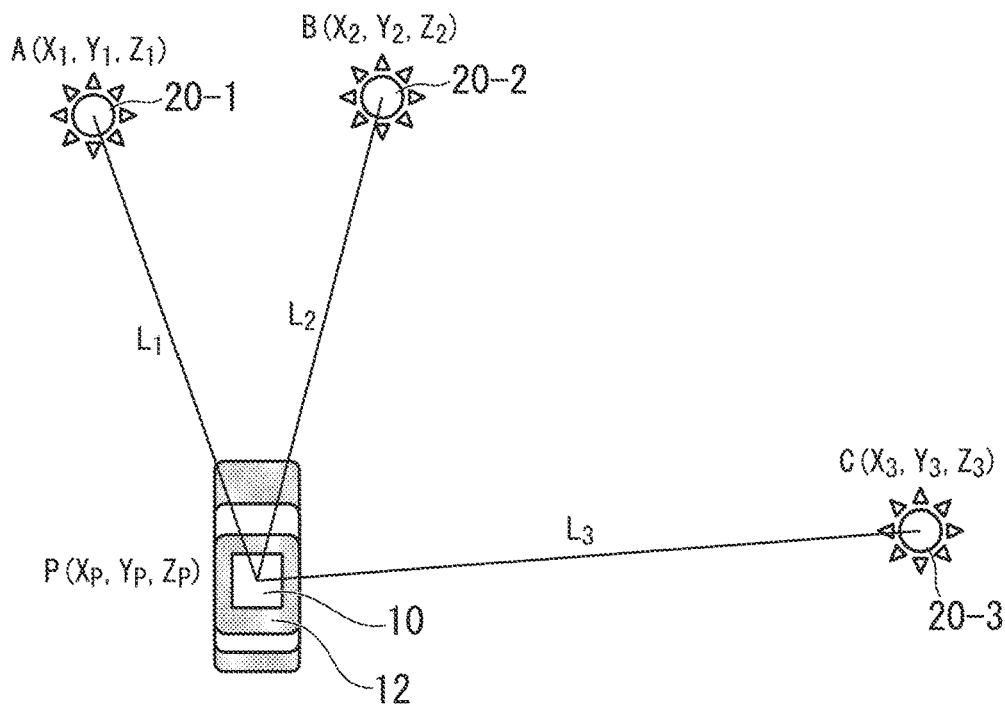
FIG. 7 shows a second algorithm according to the embodiment.

Next, the second algorithm is described. FIG. 7 shows the second algorithm according to the present embodiment.

In the second algorithm, the position of each of the first transmission apparatus 20-1 to the third transmission apparatus 20-3 is known. The position P of the vehicle 12 including the self-position estimation apparatus 10 is unknown. The position A of the first transmission apparatus 20-1, the position B of the second transmission apparatus 20-2, the position C of the third transmission apparatus 20-3, a distance $L_1$ between the position A and the position P, a distance $L_2$ between the position B and the position P, and a distance $L_3$ between the position C and the position P are known. The control unit 107 measures each of the distances $L_1$ to $L_3$ by performing an optical communication as described above.

The position calculation unit 121 solves the following Expression (8) to obtain the coordinate of the position P ($X_P$, $Y_P$, $Z_P$).

$$\left.\begin{array}{l}(X_1 - X_P)^2 + (Y_1 - Y_P)^2 + (Z_1 - Z_P)^2 = L_1^2 \\ (X_2 - X_P)^2 + (Y_2 - Y_P)^2 + (Z_2 - Z_P)^2 = L_2^2 \\ (X_3 - X_P)^2 + (Y_3 - Y_P)^2 + (Z_3 - Z_P)^2 = L_3^2\end{array}\right\} \quad (8)$$

<Third Algorithm>

Figure 8:
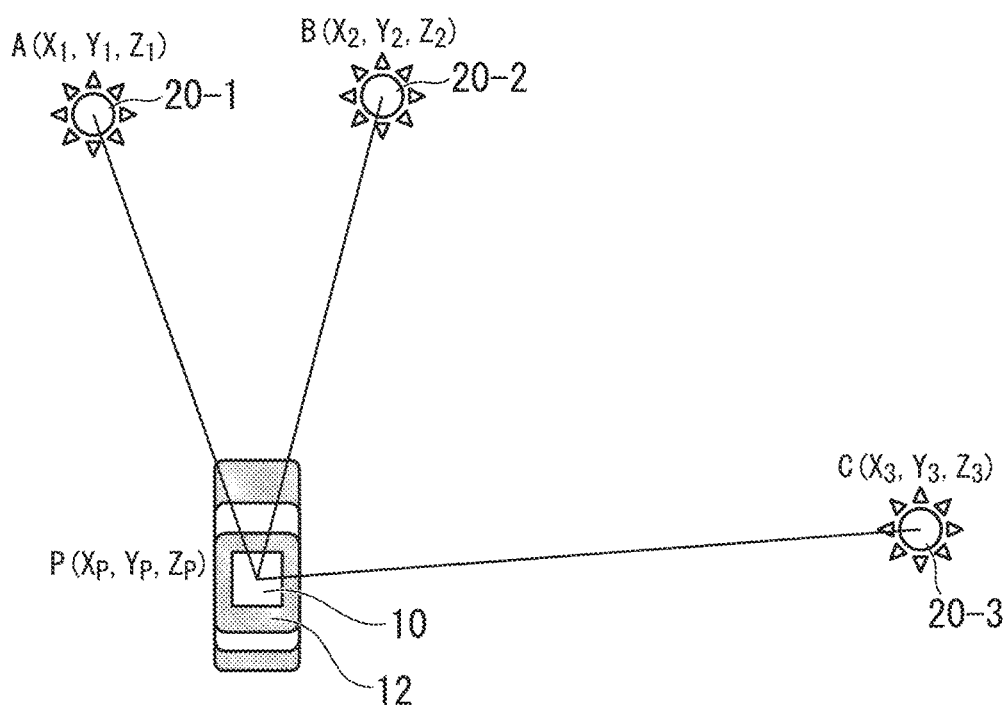
FIG. 8 shows a third algorithm according to the embodiment.

Next, the third algorithm is described. FIG. 8 shows the third algorithm according to the present embodiment.

In the third algorithm, the position of each of the first transmission apparatus 20-1 to the third transmission apparatus 20-3 is known. The position P of the vehicle 12 including the self-position estimation apparatus 10 is unknown.

The position calculation unit 121 obtains the coordinate of the position P ($X_P$, $Y_P$, $Z_P$), for example, by using the method described in "Analysis and Solutions of The Three Point Perspective Pose Estimation Problem", Robert M. Haralick, Chung-nan Lee, Karsten Ottenberg, Michael Nolle, Computer Vision and Pattern Recognition, 1991. Proceedings CVPR '91. IEEE Computer Society Conference on, IEEE, 1991 or "Systems and Replication Review and Analysis of Solutions of the Three Point Perspective Pose Estimation Problem", ROBERT M. HARALICK, CHUNG-NAN LEE, KARSTEN OTTENBERG MICHAEL NOLLE, International Journal of Computer Vision, 13, 3, 331-356, Kluwer Academic Publishers, 1994. In this case, four position candidates are calculated. Therefore, the position calculation unit 121 selects one from the four candidates by using a constraint condition (previous positions, the vehicle is on a road of which the position is known, and the like) to thereby obtain the coordinate of the position P ($X_P$, $Y_P$, $Z_P$).

<Fourth Algorithm>

Figure 9:
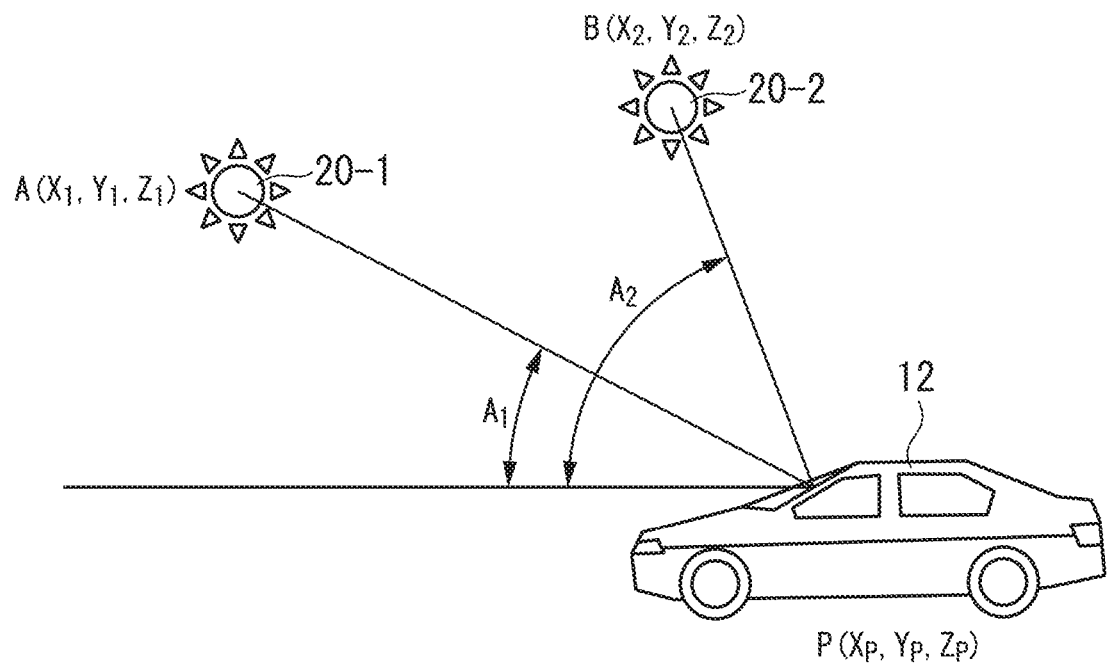
FIG. 9 shows a fourth algorithm according to the embodiment.

Next, the fourth algorithm is described. FIG. 9 shows the fourth algorithm according to the present embodiment.

In the fourth algorithm, the position of each of the first transmission apparatus 20-1 to the second transmission apparatus 20-2 is known. The position P of the vehicle 12 including the self-position estimation apparatus 10 is unknown. An altitude $Z_0$ of the position P, an angle $A_1$ in the Z-axis direction between the position A and the position P, and an angle $A_2$ in the Z-axis direction between the position B and the position P are known. Hereinafter, in the present embodiment, the angle $A_1$ and the angle $A_2$ are referred to as an elevation/depression angle. The position calculation unit 121 calculates each of the elevation/depression angles $A_1$ to $A_2$ from the direction (pan angle, tilt angle) of the light source obtained from the attitude of the vehicle 12 and the image captured by the light reception unit 102.

The position calculation unit 121 solves the following Expression (9) to obtain the coordinate of the position P ($X_P$, $Y_P$).

$$\left.\begin{array}{l}\dfrac{Z_1 - Z_P}{\sqrt{(X_1 - X_P)^2 + (Y_1 - Y_P)^2}} = \tan(A_1) \\ \dfrac{Z_2 - Z_P}{\sqrt{(X_2 - X_P)^2 + (Y_2 - Y_P)^2}} = \tan(A_2)\end{array}\right\} \quad (9)$$

<Fifth Algorithm>

Figure 10:
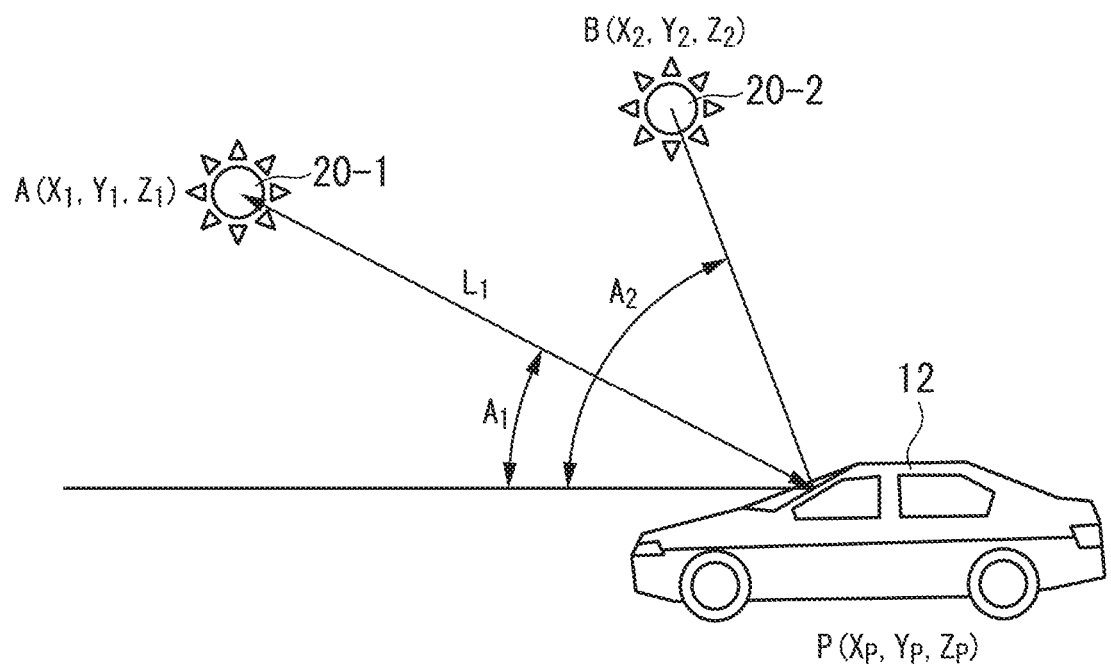
FIG. 10 shows a fifth algorithm according to the embodiment.

Next, the fifth algorithm is described. FIG. 10 shows the fifth algorithm according to the present embodiment.

In the fifth algorithm, the position of each of the first transmission apparatus 20-1 to the second transmission apparatus 20-2 is known. The position P of the vehicle 12 including the self-position estimation apparatus 10 is unknown. A distance $L_1$ between the position A and the position P, an elevation/depression angle $A_1$, and an elevation/depression angle $A_2$ are known. The control unit 107 measures the distance $L_1$ according to an optical communication. The position calculation unit 121 calculates each of the elevation/depression angles $A_1$ to $A_2$ as described above.

The position calculation unit 121 solves the following Expression (10) to obtain the coordinate of the position P ($X_P$, $Y_P$, $Z_P$).

$$\left.\begin{array}{l}\dfrac{Z_1 - Z_P}{\sqrt{(X_1 - X_P)^2 + (Y_1 - Y_P)^2}} = \tan(A_1) \\ \dfrac{Z_2 - Z_P}{\sqrt{(X_2 - X_P)^2 + (Y_2 - Y_P)^2}} = \tan(A_2) \\ (X_1 - X_P)^2 + (Y_1 - Y_P)^2 + (Z_1 - Z_P)^2 = L_1^2\end{array}\right\} \quad (10)$$

<Azimuth Angle Between Light Source and Vehicle>

A calculation method of the azimuth angle between the transmission apparatus 20, which is a light source, and the vehicle 12 including the self-position estimation apparatus 10 is described.

Figure 11:
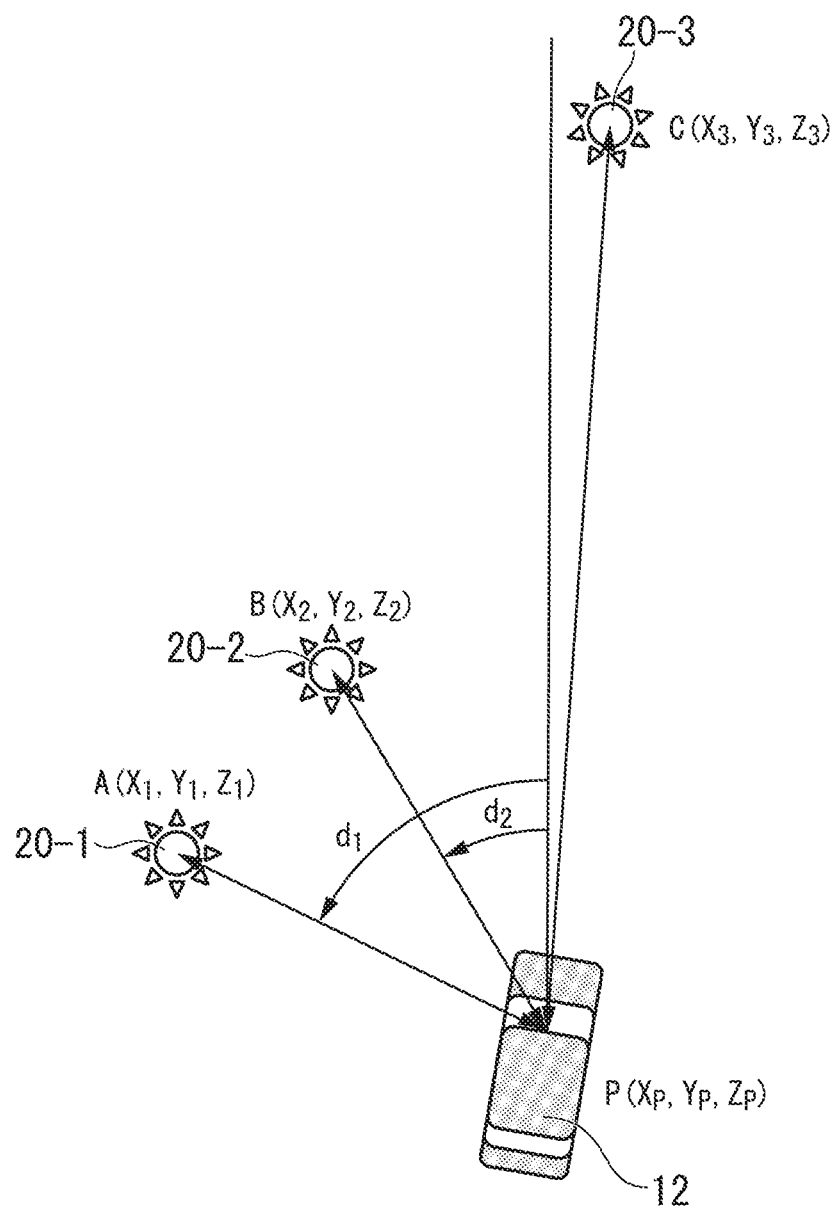
FIG. 11 shows a sixth algorithm according to the embodiment.

FIG. 11 shows the sixth algorithm according to the present embodiment.

It is assumed that an approximate positon P' (Xp', Yp', Zp') of the vehicle 12 including the self-position estimation apparatus 10 is known, and a time Δt elapses due to a movement at a speed (Vx, Vy) from the position P' to be in a situation in which the current position is unknown. In FIG. 11, the third transmission apparatus 20-3 is positioned farther than the first transmission apparatus 20-1 and the second transmission apparatus 20-2.

In this case, the position calculation unit 121 can calculate an azimuth direction (to be imaged) in which an astronomical object such as the Sun, the Moon, and a star should be seen from time, longitude, and latitude of the position calculation unit 121. When the light source is farther than a predetermined distance, the position calculation unit 121 calculates an azimuth direction d3 of the light source from the following Expression (11).

$$\dfrac{(Y_3 - Y'_P)}{(X_3 - X'_P)} = \tan(d_3) \quad (11)$$

It is assumed that the apparent direction (pan angle, tilt angle) of the light source is ($a_1$, $b_1$) with respect to the position A, is ($a_2$, $b_2$) with respect to the position B, and is ($a_3$, $b_3$) with respect to the position C. In this case, the position calculation unit 121 calculates an azimuth direction $\alpha$ ($=a_3-d_3$) of the vehicle 12.

<Sixth Algorithm>

Next, the sixth algorithm is described using FIG. 11.

In the sixth algorithm, the position of each of the first transmission apparatus 20-1 to the second transmission apparatus 20-2 is known. The position P of the vehicle 12 including the self-position estimation apparatus 10 is unknown. An azimuth angle $d_1$ between the position A and the position P and an azimuth angle $d_2$ between the position B and the position P are known.

When the direction (pan, tilt) of the light source (light signal transmitted by the transmission apparatus 20) detected from the image captured by the light reception unit 102 is ($\alpha$, $\delta$), the coordinate (x, y, z) of a normal vector can be represented by ($\cos\delta \cos\alpha$, $\cos\delta \sin\alpha$, $\sin\delta$).

The position calculation unit 121 converts the coordinate (x, y, z) of the normal vector by the following Expression (12) using the pitch and roll (p, r) of the tilted angle of the self-position estimation apparatus 10.

$$\begin{pmatrix}x'\\y'\\z'\end{pmatrix} = \begin{pmatrix}\cos p & 0 & -\sin p\\0 & 1 & 0\\\sin p & 0 & \cos p\end{pmatrix}\begin{pmatrix}1 & 0 & 0\\0 & \cos r & \sin r\\0 & -\sin r & \cos r\end{pmatrix}\begin{pmatrix}x\\y\\z\end{pmatrix} \quad (12)$$

The position calculation unit 121 corrects the direction ($\alpha$, $\delta$) of the light source detected from the image captured by the light reception unit 102 by using the following Expression (13) and the coordinate calculated according to Expression (12).

$$\begin{pmatrix}\alpha'\\\delta'\end{pmatrix} = \begin{pmatrix}\tan^{-1}\dfrac{y'}{x'}\\\tan^{-1}\dfrac{z'}{\sqrt{x'^2 + y'^2}}\end{pmatrix} \quad (13)$$

The position calculation unit 121 performs the correction described above for each light source to calculate the azimuth angle $d_1$ and the azimuth angle $d_2$.

Then, the position calculation unit 121 solves the following Expression (14) to obtain the coordinate of the position P ($X_P$, $Y_P$, $Z_P$).

$$\left.\begin{array}{l}\dfrac{Y_1 - Y_P}{X_1 - X_P} = \tan(d_1) \\ \dfrac{Y_2 - Y_P}{X_2 - X_P} = \tan(d_2)\end{array}\right\} \quad (14)$$

<Seventh Algorithm>

Figure 12:
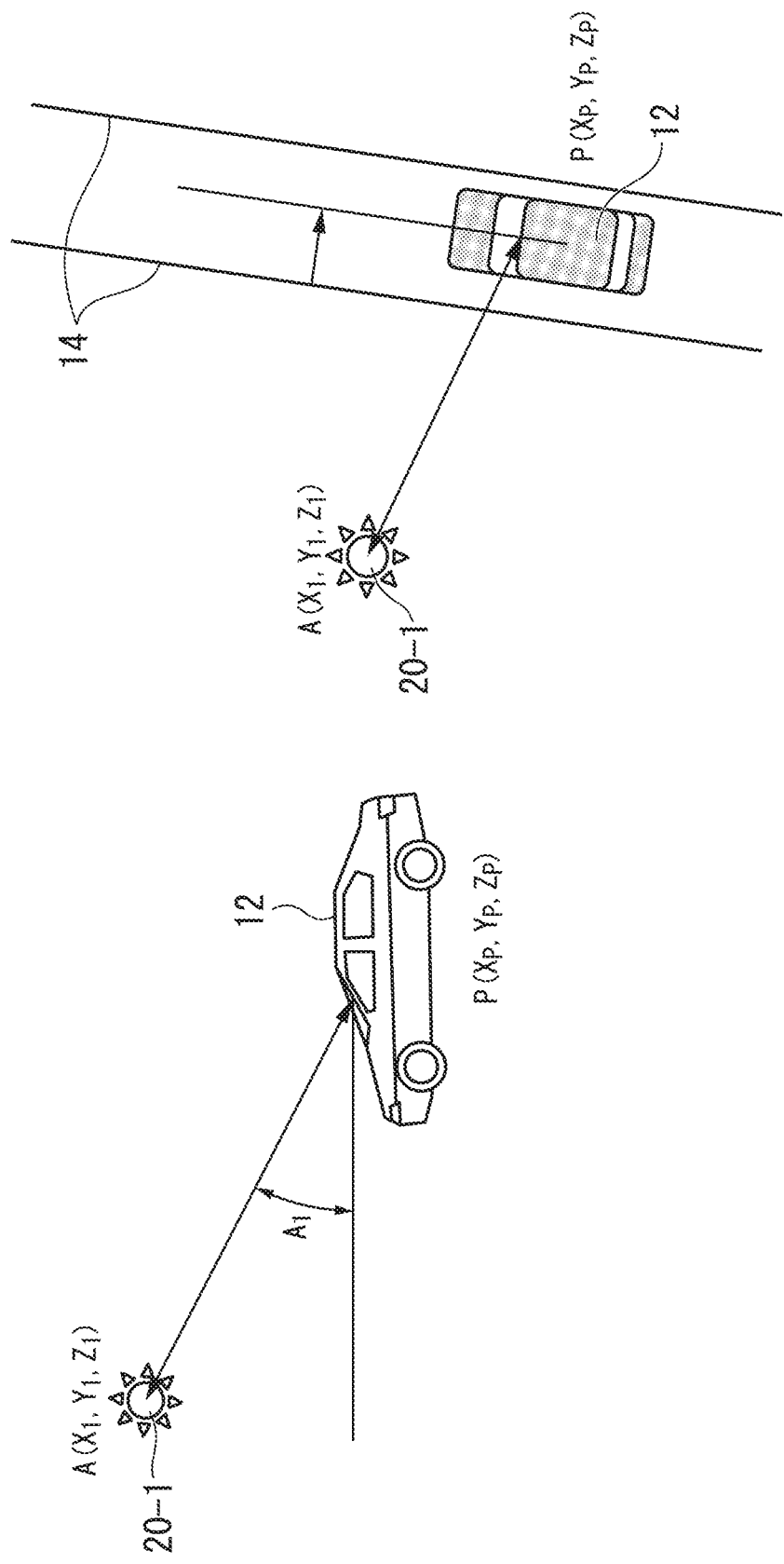
FIG. 12 shows a seventh algorithm according to the embodiment.

Next, the seventh algorithm is described. FIG. 12 shows the seventh algorithm according to the present embodiment.

In the seventh algorithm, the position of the first transmission apparatus 20-1 is known. The position of the vehicle 12 including the self-position estimation apparatus 10 is unknown but is within a lane 14. An elevation/depression angle $A_1$ is known. The position calculation unit 121 calculates the elevation/depression angle $A_1$ as described above. It is assumed that the lane (white line) in the road on which the vehicle 12 is traveling is known. The second coordinate search unit 120 obtains the coordinate of the lane as described above.

The position calculation unit 121 solves the following Expression (15) to obtain the coordinate of the position P $(X_P, Y_P, Z_P)$.

$$\frac{Z_1 - Z_P}{\sqrt{(X_1 - X_P)^2 + (Y_1 - Y_P)^2}} = \tan(A_1) \qquad (15)$$

<Eighth Algorithm>

Figure 13:
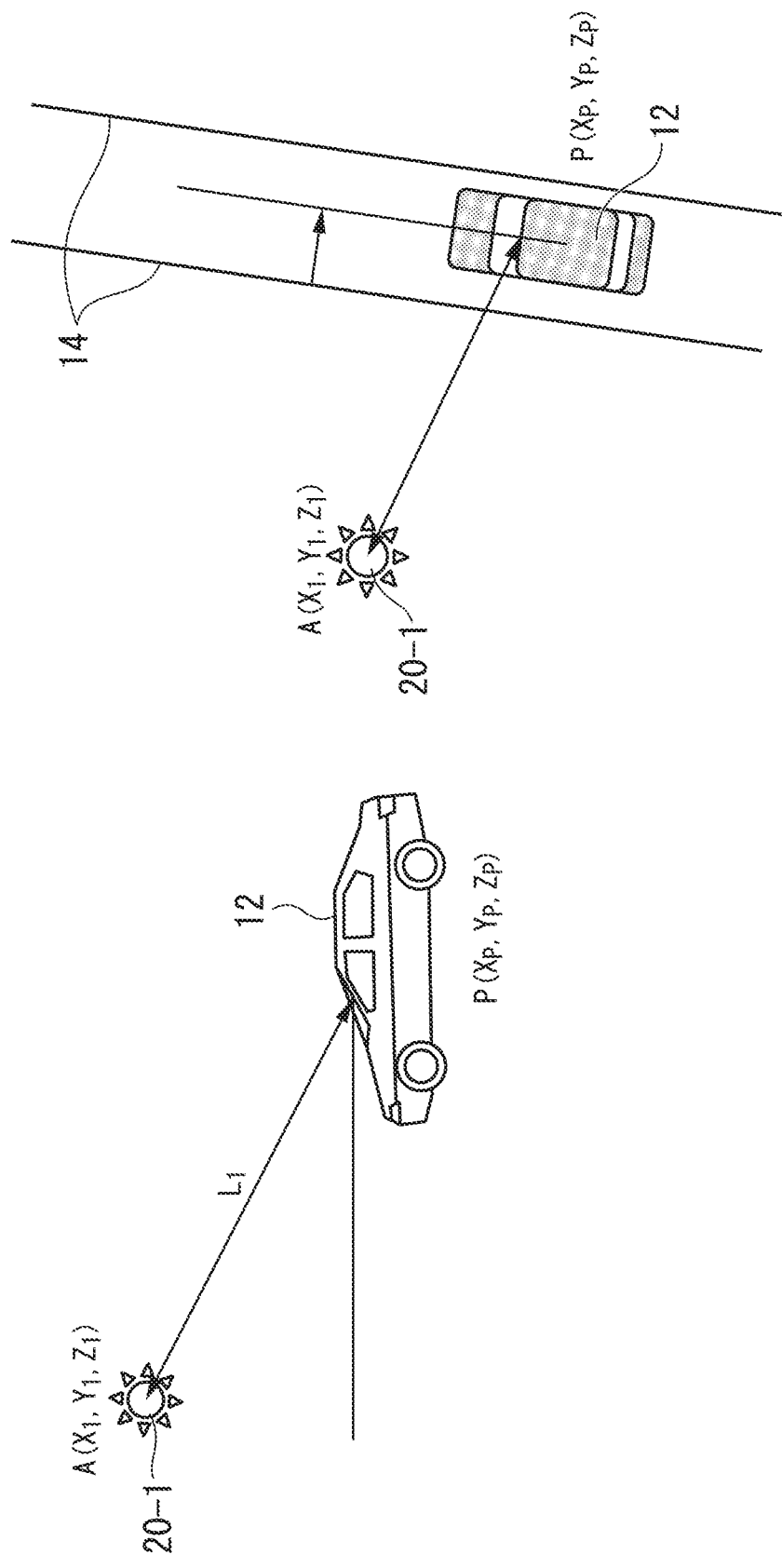
FIG. 13 shows an eighth algorithm according to the embodiment.

Next, the eighth algorithm is described. FIG. 13 shows the eighth algorithm according to the present embodiment.

In the eighth algorithm, the position of the first transmission apparatus 20-1 is known. The position of the vehicle 12 including the self-position estimation apparatus 10 is unknown but is within a lane 14. A distance $L_1$ between the position A and the position P is known. The control unit 107 measures the distance $L_1$ according to an optical communication.

The position calculation unit 121 solves the following Expression (16) to obtain the coordinate of the position P $(X_P, Y_P, Z_P)$.

$$(X_1-X_P)^2+(Y_1-Y_P)^2+(Z_1-Z_P)=L_1^2 \qquad (16)$$

<Ninth Algorithm>

Next, the ninth algorithm is described. FIG. 14 shows the ninth algorithm according to the present embodiment.

In the ninth algorithm, the position of the first transmission apparatus 20-1 is known. The position of the vehicle 12 including the self-position estimation apparatus 10 is unknown. An altitude $Z_0$ of the position P and an azimuth angle $d_1$ between the position A and the position P are known. The position calculation unit 121 calculates the azimuth angle $d_1$ as described above.

The position calculation unit 121 solves the following Expression (17) to obtain the coordinate of the position P $(X_P, Y_P)$.

$$\left.\begin{array}{l}\dfrac{Y_1 - Y_P}{X_1 - X_P} = \tan(d_1) \\[2mm] \dfrac{Z_1 - Z_P}{\sqrt{(X_1 - X_P)^2 + (Y_1 - Y_P)^2}} = \tan(A_1)\end{array}\right\} \qquad (17)$$

<Tenth Algorithm>

Next, the tenth algorithm is described. FIG. 15 shows the tenth algorithm according to the present embodiment.

In the tenth algorithm, the position of the first transmission apparatus 20-1 and the position of the vehicle 12 including the self-position estimation apparatus 10 are unknown. An azimuth angle $d_1$ between the position A and the position P and an angle $A_1$ in the Z-axis direction between the position A and the position P are known. The position calculation unit 121 calculates the angle $A_1$ as described above and calculates the azimuth angle $d_1$ as described above.

The position calculation unit 121 solves the following Expression (18) to obtain the coordinate of the position P $(X_P, Y_P, Z_P)$.

$$\left.\begin{array}{l}\dfrac{Y_1 - Y_P}{X_1 - X_P} = \tan(d_1) \\[2mm] \dfrac{Z_1 - Z_P}{\sqrt{(X_1 - X_P)^2 + (Y_1 - Y_P)^2}} = \tan(A_1) \\[2mm] (X_1 - X_P)^2 + (Y_1 - Y_P)^2 + (Z_1 - Z_P) = L_1^2\end{array}\right\} \qquad (18)$$

As described above, according to the present embodiment, when the number of transmission signals available for a self-position calculation is three, it is possible to estimate a self-position with high accuracy based on the three transmission signals which can be received.

According to the present embodiment, when the number of transmission signals available for a self-position calculation is two, it is possible to estimate a self-position with high accuracy based on the positions (position A $(X_1, Y_1, Z_0)$, position B $(X_2, Y_2, Z_2)$) of the two transmission apparatuses 20, the attitude (elevation/depression angle $A_1$, elevation/depression angle $A_2$) of the self-position estimation apparatus 10, and the altitude $(Z_0)$ of the self-position estimation apparatus 10.

According to the present embodiment, when the number of transmission signals available for a self-position calculation is two, it is possible to estimate a self-position with high accuracy based on the positions (position A $(X_1, Y_1, Z_0)$, position B $(X_2, Y_2, Z_2)$) of the two transmission apparatuses 20, the attitude (elevation/depression angle $A_1$, elevation/depression angle $A_2$) of the self-position estimation apparatus 10, and each distance $(L_1, L_2)$ between each of the two transmission apparatuses 20 and the self-position estimation apparatus 10.

According to the present embodiment, when the number of transmission signals available for a self-position calculation is two, it is possible to estimate a self-position with high accuracy based on the positions (position A $(X_1, Y_1, Z_0)$, position B $(X_2, Y_2, Z_2)$) of the two transmission apparatuses 20, the attitude of the self-position estimation apparatus 10, and each azimuth angle $(d_1, d_2)$ between each of the two transmission apparatuses 20 and the self-position estimation apparatus 10.

According to the present embodiment, when the number of transmission signals available for a self-position calculation is one, it is possible to estimate a self-position with high accuracy based on the position (position A $(X_1, Y_1, Z_0)$) of the one transmission apparatus 20, the attitude $(A_1)$ of the self-position estimation apparatus 10, the position information (constraint condition) of the road on which the vehicle 12 including the self-position estimation apparatus 10 is traveling, and the elevation/depression angle $(A_1)$ between the transmission apparatus 20 and the self-position estimation apparatus 10.

According to the present embodiment, when the number of transmission signals available for a self-position calculation is one, it is possible to estimate a self-position with high accuracy based on the position (position A $(X_1, Y_1, Z_0)$) of the one transmission apparatus 20, the attitude of the self-position estimation apparatus 10, the position information (constraint condition) of the road on which the vehicle 12 including the self-position estimation apparatus 10 is traveling, and the distance ($L_1$) between the one transmission apparatus 20 and the self-position estimation apparatus 10.

According to the present embodiment, when the number of transmission signals available for a self-position calculation is one, it is possible to estimate a self-position with high accuracy based on the position (position A ($X_1$, $Y_1$, $Z_0$)) of the one transmission apparatus 20, the attitude ($A_1$) of the self-position estimation apparatus 10, the azimuth angle ($d_1$) of the self-position estimation apparatus 10, and the altitude ($Z_0$) of the self-position estimation apparatus 10.

According to the present embodiment, when the number of transmission signals available for a self-position calculation is one, it is possible to estimate a self-position with high accuracy based on the position (position A ($X_1$, $Y_1$, $Z_0$)) of the one transmission apparatus 20, the attitude ($A_1$) of the self-position estimation apparatus 10, the azimuth angle ($d_1$) of the self-position estimation apparatus 10, and the distance ($L_1$) between the one transmission apparatus 20 and the self-position estimation apparatus 10.

The calculation example in each algorithm described above is an example, and the position calculation unit 121 may perform calculation, for example, using another calculation method such as a method according to a numerical calculation.

The vehicle including the self-position estimation apparatus 10 may be a saddle riding type vehicle (motorcycle), a motor tricycle, a four-wheel vehicle, and the like.

A program for realizing at least one of the functions included in the self-position estimation apparatus 10 and the transmission apparatus 20 in the embodiment of the invention may be recorded in a computer-readable recording medium, and the program recorded in the recording medium may be read into and executed on a computer system to thereby perform a process. It is assumed that the "computer system" used herein includes an OS or hardware such as peripherals. It is also assumed that the term "computer system" includes a WWW system including a homepage provision environment (or a display environment). The term "computer-readable recording medium" refers to a portable medium such as a flexible disk, a magneto-optical disk, a ROM, and a CD-ROM, or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

Although the embodiment of the invention has been described and shown in the drawings, the invention is not limited to the above-described embodiment, and addition, omission, and substitution of the configuration and other changes can be made without departing from the scope of the invention.

The invention claimed is:

1. A self-position estimation apparatus, comprising:
   a light receiver that comprises a pixel and receives light emission signals from a transmission apparatus via the pixel; and
   a position calculator that selects at least one, in accordance with a number of the light emission signals acquired by the light receiver and which are used for a calculation of a self-position, from a plurality of algorithms in which the self-position is estimated and calculates the self-position by using the selected algorithm,
   wherein
   when the number of the light emission signals available for a self-position calculator is three or less,
   the position calculator estimates the self-position by using at least three of a position of the transmission apparatus, an attitude of the self-position estimation apparatus, a distance between the transmission apparatus and the self-position estimation apparatus, an altitude of the self-position estimation apparatus, an azimuth angle between the transmission apparatus and the self-position estimation apparatus, an elevation or depression angle between the transmission apparatus and the self-position estimation apparatus, position information of a road on which a vehicle including the self-position estimation apparatus is traveling, and an azimuth angle of the self-position estimation apparatus.

2. The self-position estimation apparatus according to claim 1, wherein
   when the number of the light emission signals available for a self-position calculation is three, the position calculator:
   selects a first algorithm when positions of the three transmission apparatuses and an attitude of the self-position estimation apparatus are known and estimates the self-position based on the positions of the three transmission apparatuses and the attitude of the self-position estimation apparatus;
   selects a second algorithm when positions of the three transmission apparatuses and each distance between each of the three transmission apparatuses and the self-position estimation apparatus are known and estimates the self-position based on the positions of the three transmission apparatuses and each distance between each of the three transmission apparatuses and the self-position estimation apparatus; and
   selects a third algorithm when positions of the three transmission apparatuses are known and estimates the self-position based on the positions of the three transmission apparatuses.

3. The self-position estimation apparatus according to claim 1, wherein
   when the number of the light emission signals available for a self-position calculation is two, the position calculator selects a fourth algorithm when positions of the two transmission apparatuses, an attitude of the self-position estimation apparatus, and an altitude of the self-position estimation apparatus are known and estimates the self-position based on the positions of the two transmission apparatuses, the attitude of the self-position estimation apparatus, and the altitude of the self-position estimation apparatus.

4. The self-position estimation apparatus according to claim 1, wherein
when the number of the light emission signals available for a self-position calculation is two, the position calculator selects a fifth algorithm when positions of the two transmission apparatuses, an attitude of the self-position estimation apparatus, and each distance between each of the two transmission apparatuses and the self-position estimation apparatus are known and estimates the self-position based on the positions of the two transmission apparatuses, the attitude of the self-position estimation apparatus, and each distance between each of the two transmission apparatuses and the self-position estimation apparatus.

5. The self-position estimation apparatus according to claim 1, wherein
when the number of the light emission signals available for a self-position calculation is two, the position calculator selects a sixth algorithm when positions of the two transmission apparatuses, an attitude of the self-position estimation apparatus, and each azimuth angle between each of the two transmission apparatuses and the self-position estimation apparatus are known and estimates the self-position based on the positions of the two transmission apparatuses, the attitude of the self-position estimation apparatus, and each azimuth angle between each of the two transmission apparatuses and the self-position estimation apparatus.

6. The self-position estimation apparatus according to claim 1, wherein
when the number of the light emission signals available for a self-position calculation is one, the position calculator selects a seventh algorithm when a position of the one transmission apparatus, an attitude of the self-position estimation apparatus, position information of a road on which a vehicle including the self-position estimation apparatus is traveling, and an elevation or depression angle between the transmission apparatus and the self-position estimation apparatus are known and estimates the self-position based on the position of the one transmission apparatus, the attitude of the self-position estimation apparatus, the position information of the road on which the vehicle including the self-position estimation apparatus is traveling, and the elevation or depression angle between the transmission apparatus and the self-position estimation apparatus.

7. The self-position estimation apparatus according to claim 1, wherein
when the number of the light emission signals available for a self-position calculation is one, the position calculator selects an eighth algorithm when a position of the one transmission apparatus, an attitude of the self-position estimation apparatus, position information of a road on which a vehicle including the self-position estimation apparatus is traveling, and a distance between the one transmission apparatus and the self-position estimation apparatus are known and estimates the self-position based on the position of the one transmission apparatus, the attitude of the self-position estimation apparatus, the position information of the road on which the vehicle including the self-position estimation apparatus is traveling, and the distance between the one transmission apparatus and the self-position estimation apparatus.

8. The self-position estimation apparatus according to claim 1, wherein
when the number of the light emission signals available for a self-position calculation is one, the position calculator selects a ninth algorithm when a position of the one transmission apparatus, an attitude of the self-position estimation apparatus, an azimuth angle of the self-position estimation apparatus, and an altitude of the self-position estimation apparatus are known and estimates the self-position based on the position of the one transmission apparatus, the attitude of the self-position estimation apparatus, the azimuth angle of the self-position estimation apparatus, and the altitude of the self-position estimation apparatus.

9. The self-position estimation apparatus according to claim 1, wherein
when the number of the light emission signals available for a self-position calculation is one, the position calculator selects a tenth algorithm when a position of the one transmission apparatus, an attitude of the self-position estimation apparatus, an azimuth angle of the self-position estimation apparatus, and a distance between the one transmission apparatus and the self-position estimation apparatus are known and estimates the self-position based on the position of the one transmission apparatus, the attitude of the self-position estimation apparatus, the azimuth angle of the self-position estimation apparatus, and the distance between the one transmission apparatus and the self-position estimation apparatus.

10. A self-position estimation apparatus comprising:
a light receiver that comprises a pixel and receives light emission signals from a transmission apparatus via the pixel; and
a position calculator that selects at least one, in accordance with the number of the light emission signals acquired by the light receiver and which are used for a calculation of a self-position, from a plurality of algorithms in which the self-position is estimated and calculates the self-position by using the selected algorithm,
wherein
when the light receiver acquires four or more light emission signals, the position calculator calculates the self-position according to at least one of: a process of selecting three or less light emission signals from the four or more light emission signals, selecting two or more algorithms from the plurality of algorithms by using the selected light emission signals, and selecting at least one algorithm from the two or more algorithms based on a predetermined priority or selecting at least one from the self-positions calculated according to the two or more algorithms based on a predetermined priority; a process of performing a predetermined weighting with respect to the calculated self-positions and then calculating an average of the weighted self-positions; and a process of performing a clustering with respect to the calculated self-positions and calculating the self-position based on a cluster.

11. A self-position estimation method, comprising:
(a) by way of a light receiver that comprises a pixel, receiving light emission signals from a transmission apparatus via a pixel;
(b) by way of a position calculator, selecting at least one, in accordance with the number of the light emission signals acquired in (a) and which are used for a calculation of a self-position, from a plurality of algorithms in which the self-position is estimated; and (c) by way of the position calculator, calculating the self-position by using the algorithm selected in (b), wherein when the number of the light emission signals available for a self-position calculation is three or less, the position calculator estimates the self-position by using at least three of a position of the transmission apparatus, an attitude of the self-position estimation apparatus, a distance between the transmission apparatus and the self-position estimation apparatus, an altitude of the self-position estimation apparatus, an azimuth angle between the transmission apparatus and the self-position estimation apparatus, an elevation or depression angle between the transmission apparatus and the self-position estimation apparatus, position information of a road on which a vehicle including the self-position estimation apparatus is traveling, and an azimuth angle of the self-position estimation apparatus.

\* \* \* \* \*